United States Patent
Yilmaz et al.

(10) Patent No.: US 11,057,817 B2
(45) Date of Patent: Jul. 6, 2021

(54) USER EQUIPMENT, NETWORK NODE AND METHOD IN A WIRELESS COMMUNICATIONS NETWORK

(71) Applicant: Telefonaktiebolaget LM Ericsson (publ), Stockholm (SE)

(72) Inventors: Osman Nuri Can Yilmaz, Espoo (FI); Antonino Orsino, Masala (FI); Stefan Wager, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 135 days.

(21) Appl. No.: 16/476,458

(22) PCT Filed: Apr. 29, 2019

(86) PCT No.: PCT/SE2019/050384
§ 371 (c)(1),
(2) Date: Jul. 8, 2019

(87) PCT Pub. No.: WO2020/222681
PCT Pub. Date: Nov. 5, 2020

(65) Prior Publication Data
US 2020/0359441 A1    Nov. 12, 2020

(51) Int. Cl.
*H04L 5/00*    (2006.01)
*H04W 24/10*    (2009.01)
(Continued)

(52) U.S. Cl.
CPC .......... *H04W 36/305* (2018.08); *H04L 5/001* (2013.01); *H04L 5/0053* (2013.01);
(Continued)

(58) Field of Classification Search
CPC ............ H04L 5/00–0098; H04W 4/70; H04W 8/22–245; H04W 24/02–10;
(Continued)

(56) References Cited

U.S. PATENT DOCUMENTS

2011/0021154 A1*  1/2011  Marinier ................. H04L 5/001
2014/0056243 A1   2/2014  Pelletier et al.
(Continued)

FOREIGN PATENT DOCUMENTS

| WO | 2015176738 A1 | 11/2015 |
| WO | 2016045625 A2 | 3/2016 |
| WO | 2016182670 A1 | 11/2016 |

OTHER PUBLICATIONS

"3GPP TS 38.304 V15.3.0"; 3rd Generation Partnership Project; Technical Specification Group Radio Access Network; NR; User Equipment (UE) procedures in Idle mode and RRC Inactive state (Release 15), Mar. 2019, pp. 1-29.
(Continued)

*Primary Examiner* — Timothy J Weidner
(74) *Attorney, Agent, or Firm* — Murphy, Bilak & Homiller, PLLC

(57) ABSTRACT

A method performed by a User Equipment (UE) for handling Radio Link Failure (RLF) in a wireless communications network is provided. The UE reactivates (602) a deactivated first Secondary Cell (SCell) when an RLF over a Primary Cell (PCell) is detected. The UE further sends (603) an indication to a network node, via the reactivated SCell. The indication indicates any one or more out of the RLF over the PCell or the reactivated first SCell.

20 Claims, 15 Drawing Sheets

(51) Int. Cl.
| | |
|---|---|
| *H04W 36/00* | (2009.01) |
| *H04W 36/36* | (2009.01) |
| *H04W 36/38* | (2009.01) |
| *H04W 72/04* | (2009.01) |
| *H04W 74/08* | (2009.01) |
| *H04W 76/11* | (2018.01) |
| *H04W 76/18* | (2018.01) |
| *H04W 76/19* | (2018.01) |
| *H04W 76/27* | (2018.01) |
| *H04W 84/02* | (2009.01) |
| *H04W 88/06* | (2009.01) |
| *H04W 88/10* | (2009.01) |
| *H04W 92/02* | (2009.01) |
| *H04W 92/10* | (2009.01) |
| *H04W 36/30* | (2009.01) |

(52) U.S. Cl.
CPC .......... *H04L 5/0085* (2013.01); *H04L 5/0098* (2013.01); *H04W 24/10* (2013.01); *H04W 36/0069* (2018.08); *H04W 36/36* (2013.01); *H04W 36/38* (2013.01); *H04W 72/042* (2013.01); *H04W 72/048* (2013.01); *H04W 72/0413* (2013.01); *H04W 72/0453* (2013.01); *H04W 74/0833* (2013.01); *H04W 74/0866* (2013.01); *H04W 76/11* (2018.02); *H04W 76/18* (2018.02); *H04W 76/19* (2018.02); *H04W 76/27* (2018.02); *H04W 84/02* (2013.01); *H04W 88/06* (2013.01); *H04W 88/10* (2013.01); *H04W 92/02* (2013.01); *H04W 92/10* (2013.01)

(58) Field of Classification Search
CPC ... H04W 28/02–26; H04W 36/00–385; H04W 48/02–20; H04W 56/0005–0025; H04W 60/005–06; H04W 72/005–14; H04W 74/002–891; H04W 76/00–50; H04W 84/02; H04W 84/04–047; H04W 88/02; H04W 88/04–12; H04W 92/02; H04W 92/04; H04W 92/10
See application file for complete search history.

(56) References Cited

U.S. PATENT DOCUMENTS

2016/0338137 A1\* 11/2016 Mishra ................. H04W 36/08
2020/0245390 A1\* 7/2020 Ali .................... H04W 36/0069

OTHER PUBLICATIONS

"3GPP TS 36.331 V15.5.1", 3rd Generation Partnership Project; Technical Specification Group Radio Access Network; Evolved Universal Terrestrial Radio Access (E-UTRA); Radio Resource Control (RRC); Protocol specification (Release 15), Apr. 2019, pp. 1-948.

"3GPP TS 38.331 V15.5.0", 3rd Generation Partnership Project; Technical Specification Group Radio Access Network; NR; Radio Resource Control (RRC) protocol specification (Release 15), Mar. 2019, pp. 1-491.

\* cited by examiner

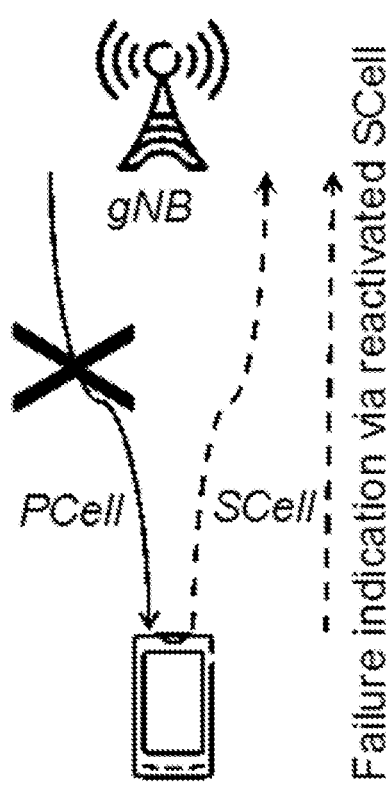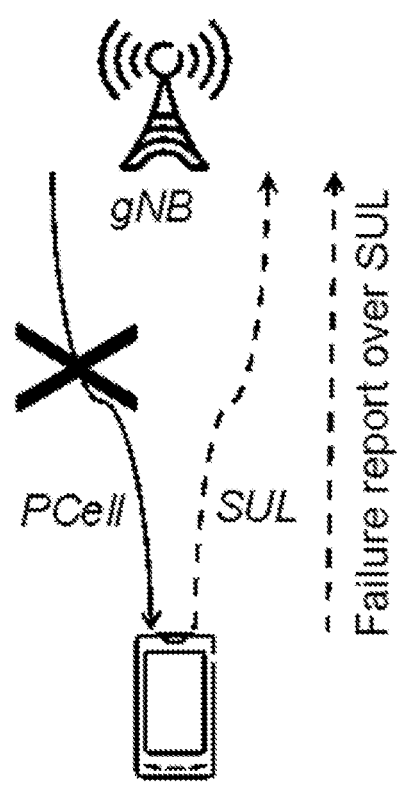
Fig. 8 a)  Fig. 8 b)

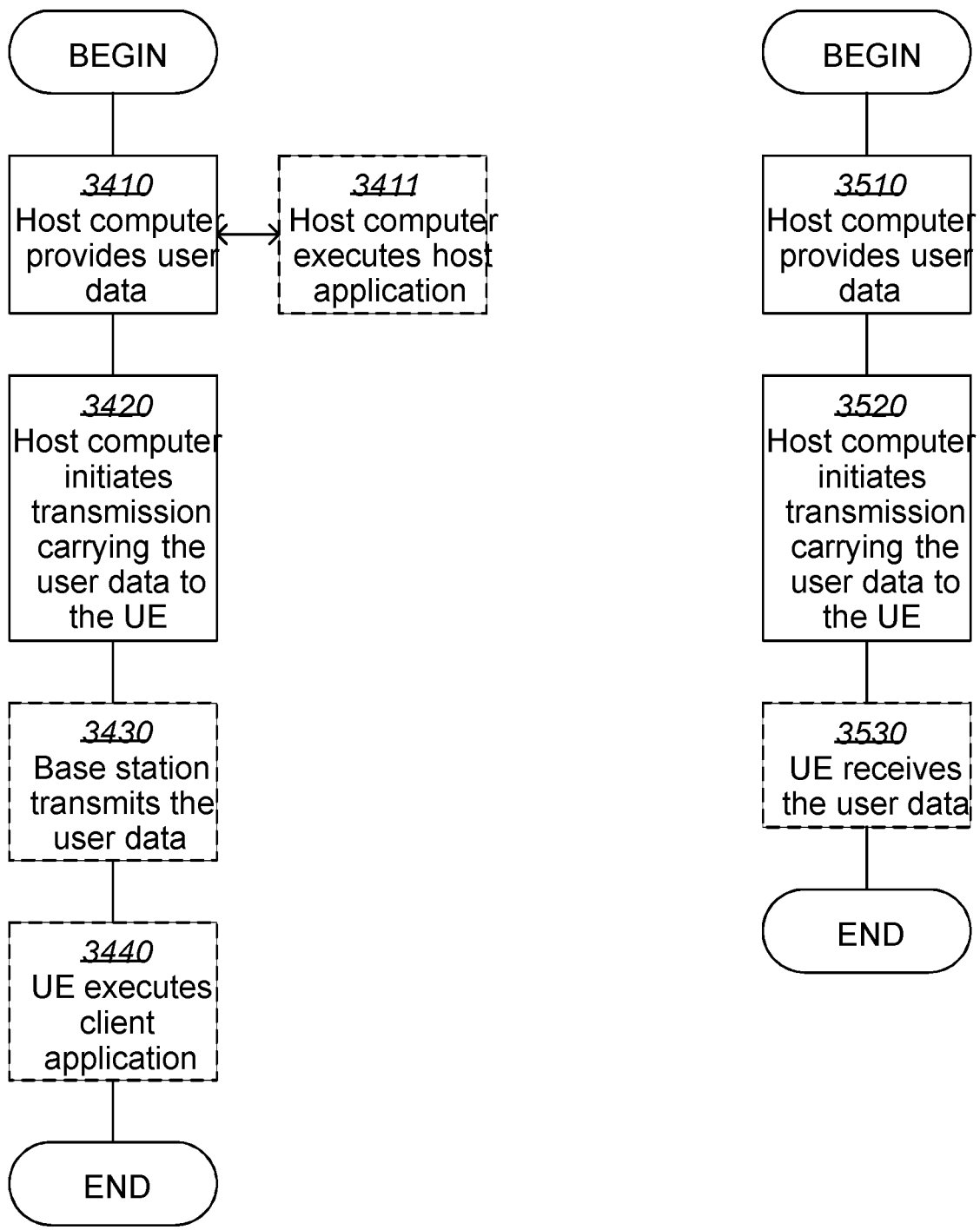

USER EQUIPMENT, NETWORK NODE AND METHOD IN A WIRELESS COMMUNICATIONS NETWORK

TECHNICAL FIELD

Embodiments herein relate to a User Equipment (UE), a network node and methods therein. In some aspects, they relate to handling of Radio Link Failure (RLF) in a wireless communications network.

BACKGROUND

In a typical wireless communication network, wireless devices, also known as wireless communication devices, mobile stations, stations (STA) and/or User Equipments (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a 5G network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

3GPP Dual Connectivity

There are different ways to deploy 5G network with or without interworking with LTE and EPC, which is referred to as different options. In principle, NR and LTE may be deployed without any interworking, denoted by NR Stand-Alone (SA) operation, that is gNB in NR may be connected to 5GC (Option 1) and eNB may be connected to EPC (Option 2) with no interconnection between the two.

On the other hand, the first supported version of NR is the so-called E-UTRAN-NR Dual Connectivity (EN-DC), (Option 3). In Option 3, a deployment, dual connectivity between NR and LTE is applied with LTE as a master node and NR as a secondary node. The RAN node (gNB) supporting NR, may not have a control plane connection to EPC, instead it relies on the LTE as Master node (MeNB). This is also referred to as Non-standalone NR. It should be noted that that in this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, option 2 supports stand-alone NR deployment where gNB is connected to 5GC. Similarly, LTE may also be connected to 5GC using eLTE, E-UTRA/5GC, or LTE/5GC and the node may be referred to as an ng-eNB (Option 5). eLTE means that LTE is connected to 5GC. In these cases, both NR and LTE are seen as part of the NG-RAN (and both the ng-eNB and the gNB can be referred to as NG-RAN nodes).

It is worth noting that, Option 4 and Option 7 are other variants of dual connectivity between LTE and NR which will be standardized as part of NG-RAN connected to 5GC, denoted by MR-DC (Multi-Radio Dual Connectivity). The following is comprised under the MR-DC umbrella:
  EN-DC (Option 3): LTE is the master node and NR is the secondary (EPC CN employed)
  NE-DC (Option 4): NR is the master node and LTE is the secondary (5GCN employed)
  NGEN-DC (Option 7): LTE is the master node and NR is the secondary (5GCN employed)
  NR-DC (variant of Option 2): Dual connectivity where both the master and secondary are NR (5GCN employed).

As migration for these options may differ from different operators, it is possible to have deployments with multiple options in parallel in the same network e.g. there may be eNB base station supporting option 3, 5 and 7 in the same network as NR base station supporting 2 and 4. In combination with dual connectivity solutions between LTE and NR it is also possible to support Carrier Aggregation (CA) in each cell group, i.e. MCG and SCG, and dual connectivity between nodes on same RAT, e.g. NR-NR DC. For the LTE cells, a consequence of these different deployments is the co-existence of LTE cells associated to eNBs connected to EPC, 5GC or both EPC and 5GC.

As mentioned earlier, DC is standardized for both LTE and E-UTRA-NR DC (EN-DC).

LTE DC and EN-DC are design differently when it comes to which nodes control what. Basically, there may be at least two options:
  1. Centralized solution, like LTE-DC,
  2. Decentralized solution, like EN-DC.

FIG. 1 shows what the schematic control plane architecture looks like for LTE DC and EN-DC. The main difference here is that in EN-DC, a Secondary Node (SN) has a separate RRC entity (NR RRC). In FIG. 1, S1-C is the control plane interface between RAN and CN and Uu is radio interface between UE and network. Also in FIG. 1, Xn-C is the control plane interface between network RAN nodes, and Xx-C is the control plane interface between RAN or NG-RAN nodes. RRC, used in FIG. 1 for LTE-RRC and NR-RRC, is an abbreviation for Radio Resource Control.

This means that the SN may control the UE also; sometimes without the knowledge of the Master Node (MN) but often the SN need to coordinate with the MN. In LTE-DC, the RRC decisions are always coming from the MN, (MN to UE. Note however, the SN still decides the configuration of the SN, since it is only the SN itself that has knowledge of what kind of resources, capabilities etc. the SN have.

Below two different DC specifications and their RRC messages will be described in more detail.

LTE-NR DC, also referred to as LTE-NR tight interworking, is currently being discussed for 3GPP release 15. In this context, the major changes from LTE DC are:

The introduction of split bearer from the SN, known as SCG split bearer.
The introduction of split bearer for RRC.
The introduction of a direct RRC from the SN, also referred to as SCG Signaling Radio Bearer (SRB).

FIG. 2 and FIG. 3 show the UP and Control Plane (CP) architectures for LTE-NR tight interworking. FIG. 3 shows LTE-NR tight interworking (UP), and FIG. 4 shows LTE-NR tight interworking (CP).

In FIGS. 3 and 4 the several abbreviations are used, such as: Master Cell Group (MCG), RRC (Radio Resource Control), PDCP (Packet Data Convergence Protocol), RLC (Radio Link Control), MAC (Medium Access Control), MN (Master Node), SN (Secondary Node), SCG (Secondary Cell Group), SRB (Signaling Radio Bearer) and PHY (Physical layer).

The SN is sometimes referred to as SgNB, where gNB is an NR base station, and the MN as MeNB in case the LTE is the master node and NR is the secondary node. In the other case where NR is the master and LTE is the secondary node, the corresponding terms are SeNB and MgNB.

Split SRBs are mainly used for creating diversity, and the sender may decide to either choose one of the links for scheduling the RRC messages, or it may duplicate the message over both links. In the downlink, the path switching between the MCG or SCG legs or duplication on both is left to network implementation. On the other hand, for the UL, the network configures the UE to use the MCG, SCG or both legs. The terms "leg" and "path" are used interchangeably throughout this document.

Supplementary Uplink

In EN-DC, to improve the uplink coverage of the secondary node (NR) working on high frequencies, a Supplementary Uplink (SUL) may be configured. With SUL, the UE is configured with two UL carriers (and one DL) on the same cell and the switching between one carrier and another is controlled by the network through L1 signaling. When a SUL is configured to a UE, it is an additional uplink only SCell and the control of the SUL depends on a regular paired PCell. Also, differently from carrier aggregation, the UE is not allowed to use both carrier at the same time but is the network that indicates which carrier to use. For this case, usually the UE is configured with a contention free random access resource. Otherwise, if no indication is provided by the network, the UE performs a contention based random access procedure on the carrier (SUL or non-SUL) with the highest Reference Signal Received Power (RSRP) value. For Physical Uplink Shared Channel (PUSCH), each grant indicates whether UL or SUL is used. Thus, the network ensures through scheduling that only UL or SUL is used at a time. For Physical Uplink Control Channel (PUCCH), configuration can only be provided on one of the two uplinks at the time.

FIG. 4 shows Supplementary uplink in EN-DC

Carrier Aggregation

When Carrier Aggregation CA is configured, the UE only has one RRC connection with the network. Further, at RRC connection establishment/re-establishment/handover, one serving cell provides the NAS mobility information, and at RRC connection re-establishment/handover, one serving cell provides the security input. This cell is referred to as the Primary Cell (PCell). In addition, depending on UE capabilities, Secondary Cells (SCells) can be configured to form together with the PCell a set of serving cells. The configured set of serving cells for a UE therefore always consists of one PCell and one or more SCells. Further, when dual connectivity is configured, it could be the case that one carrier under the SCG is used as the Primary SCell (PSCell). Hence, in this case we have one PCell and one or more SCell(s) over the MCG and one PSCell and one or more SCell(s) over the SCG.

The reconfiguration, addition and removal of SCells can be performed by RRC. At intra-RAT handover, RRC can also add, remove, or reconfigure SCells for usage with the target PCell. When adding a new SCell, dedicated RRC signalling is used for sending all required system information of the SCell i.e. while in connected mode, UEs need not acquire broadcasted system information directly from the SCells.

Bandwidth Adaptation

To enable Bandwidth Adaptation (BA) on the PCell, the gNB configures the UE with UL and DL Bandwidth Part (BWP)(s). To enable BA on SCells in case of CA, the gNB configures the UE with DL BWP(s) at least, i.e. there may be none in the UL. For the PCell, the initial BWP is the BWP used for initial access. For the SCell(s), the initial BWP is the BWP configured for the UE to first operate at SCell activation. In paired spectrum, DL and UL can switch BWP independently. In unpaired spectrum, DL and UL switch BWP simultaneously. Switching between configured BWPs happens by means of RRC signalling, DCI, inactivity timer or upon initiation of random access. When an inactivity timer is configured for a serving cell, the expiry of the inactivity timer associated to that cell switches the active BWP to a default BWP configured by the network. There can be at most one active BWP per cell, except when the serving cell is configured with SUL, in which case there can be at most one on each UL carrier.

Activation/Deactivation Mechanism

To enable reasonable UE battery consumption when CA is configured, an activation/deactivation mechanism of Cells is supported. When an SCell is deactivated, the UE does not need to receive the corresponding Physical Downlink Control Channel (PDCCH) or Physical Downlink Shared Channel PDSCH, cannot transmit in the corresponding uplink, nor is it required to perform Channel Quality Indicator (CQI) measurements. Conversely, when an SCell is active, the UE shall receive PDSCH and PDCCH, if the UE is configured to monitor PDCCH from this SCell, and is expected to be able to perform CQI measurements. NG-RAN ensures that while PUCCH SCell, a Secondary Cell configured with PUCCH, is deactivated, SCells of secondary PUCCH group, a group of SCells whose PUCCH signalling is associated with the PUCCH on the PUCCH Scell, should not be activated. NG-RAN ensures that SCells mapped to PUCCH SCell are deactivated before the PUCCH SCell is changed or removed.

When reconfiguring the set of serving cells:
SCells added to the set are initially deactivated;
SCells which remain in the set, either unchanged or reconfigured, do not change their activation status, activated or deactivated.

At handover:
SCells are deactivated.

To enable reasonable UE battery consumption when BA is configured, only one UL BWP for each uplink carrier and one DL BWP or only one DL/UL BWP pair can be active at a time in an active serving cell, all other BWPs that the UE is configured with being deactivated. On deactivated BWPs, the UE does not monitor the PDCCH, does not transmit on PUCCH, Physical Random Access Channel (PRACH) and UL-SCH.

Radio Link Failure

In LTE, a UE considers a Radio Link Failure (RLF) to be detected when:

i. Upon detecting a certain number of out of sync indications from the lower layers associated with the Primary Cell (PCell) within a given time, or ii. upon random access problem indication from Medium Access Control (MAC), or iii. upon indication from Radio Link Control (RLC) that the maximum number of retransmissions has been reached for an SRB or for a Data Radio Bearer (DRB).

When RLF is detected, the UE prepares an RLF report, which includes, among other information, the measurement status of the serving and neighbour cells at the moment when RLF was detected, goes to IDLE mode, selects a cell following IDLE mode cell selection procedure, the selected cell may be the same serving node/cell or another node/cell, and start the RRC re-establishment procedure, with a cause value set to rlf-cause.

In the case of LTE DC, the RLF detection procedure is similar to what was described above except that for (i), we are concerned only the PCell of the MN, the MAC in (ii) is the MCG MAC entity and the RLC in (iii) is the MCG RLC and the DRB in (iii) corresponds to MCG and MCG-split DRBs.

On the other hand, failure on the secondary side, known as SCG Failure, is detected by:

a) upon detecting radio link failure for the SCG, in accordance with i, ii and iii above (i.e. replace PCell for PSCell, MCG MAC for SCG MAC, and MCG/MCG-Split DRB for SCG DRB), or b) upon SCG change failure (i.e. not able to finalize SCG change within a certain duration after the reception of an RRC connection reconfiguration message instructing the UE to do so), or c) upon stopping uplink transmission towards the PSCell due to exceeding the maximum uplink transmission timing difference when powerControlMode is configured to 1.

Upon detecting SCG Failure, the UE sends an SCG Failure Information message towards the MN, which also includes measurement reports, and the MN can either release the SN, change the SN/Cell, or reconfigure the SCG. Thus, a failure on the SCG will not lead to a re-establishment to be performed on the MCG.

3GPP has agreed to adopt the same principles in the context of LTE-NR interworking (i.e. re-establishment in the case of RLF on the master leg and recovery via SCG Failure Information and SN release/change/modification in case of RLF on the secondary leg). Specifically, it has been agreed:

Upon SgNB failures, UE shall:
Suspend all SCG DRBs and suspend SCG transmission for MCG split DRBs, and SCG split DRBs;
Suspend direct SCG SRB and SCG transmission for MCG split SRB;
Reset SCG-MAC;
send the SCG Failure Information message to the MeNB with corresponding cause values.

Furthermore, in RAN2 #99 meeting the following agreements has been made for the user plane in case the RLF happens on the SCell when CA level duplication is employed:

Agreements:
Radio Link Control (RLC) reports max Number of RLC retransmissions are reached to RRC.

For a logical channel restricted to one or multiple SCell(s) (i.e. logical channel configured for duplication) UE reports the failure to the gNB (e.g. SCell-RLF) but no RRC re-establishment happens The procedures for NR radio link failure detection related actions are shown below (text pasted from 3GPP TS 38.331):

5.3.10 Radio Link Failure Related Actions 5.3.10.1 Detection of Physical Layer Problems in RRC_CONNECTED The UE shall:
1> upon receiving N310 consecutive "out-of-sync" indications for the SpCell from lower layers while neither T300, T301. T304, T319 not T311 is running:
  2> start timer T310 for the corresponding SpCell.

5.3.10.2 Recovery of Physical Layer Problems

Upon receiving N311 consecutive "iii sync" indications for the SpCell from lower layers while 1310 is running, the UE shall:
1> stop timer T310 for the corresponding SpCell.
NOTE 1: In this case, the UE maintains the RRC connection without explicit signalling, i.e. the UE maintains the entire radio resource configuration.
NOTE 2: Periods in time where neither "in-sync" nor "out-of-sync" is reported by layer 1 do not affect the evaluation of the number of consecutive "in-sync" or "out-of-sync" indications.

5.3.10.3 Detection of Radio Link Failure

The UE shall:
1> upon T310 expiry in PCell; or
1> upon random access problem indication from MCG MAC while neither T300, T301, T304 nor T311 is running; or
1> upon indication from MCG RLC that the maximum number of retransmissions has been reached:
  2> if CA duplication is configured and activated; and for the corresponding logical channel allowedServingCells only includes SCell(s):
    3> initiate the failure information procedure as specified in 5.7.x to report RLC failure.
  2> else:
    3> consider radio link failure to be detected for the MCG i.e. RLF;
    3> if AS security has not been activated:
      4> perform the actions upon going, to RRC_IDLE as specified 5.3.11, with release cause 'other';
    3> else:
      4> initiate the connection re-establishment procedure as specified in 5.3.7.

The UE shall:
1> upon T310 expiry in PSCell; or
1> upon random access problem indication from SCG MAC; or
1> upon indication from SCG RLC that the maximum number of retransmissions has been reached:
  2> if CA duplication is configured and activated; and for the corresponding logical channel allowedServingCells only includes SCell(s):
    3> initiate the failure information procedure as specified in 5.7.x to report RLC failure.
  2> else:
    3> consider radio link failure to be detected for the SCG i.e. SCG-RLF;
  2> initiate the SCG failure information procedure as specified in 5.7.3 to report SCG radio link failure.

5.7.5 Failure Information
5.7.5.1 General
The UE sends Failure information to the network.
The purpose of this procedure is to inform the network about a failure detected by the UE.
5.7.5.2 Initiation
A UE initiates the procedure when there is a need inform the network about a failure detected by the UE. In particular, the LTE initiates the procedure when the following condition is met:
1> upon detecting failure for an RLC bearer, in according with 5.3.10;
Upon initiating the procedure, the UE shall:
1> initiate transmission of the FailureInformation message as specified in 5.7.5.3;
5.7.5.3 Actions Related to Transmission of FailureInformation message
The UE shall:
1> if initiated to provide RLC failure information:
  2> set logicalChannelIdentity to the logical channel identity of the failing RLC bearer:
  2> set cellGroupIndication to the cell group of the failing RLC bearer;
  2> set failureType to the of failure that war detected;
1> if used to inform the network about a failure for an MCG RLC bearer:
  2> submit the FailureInformation message to lower layers for transmission via SRB1;
1> else if used to inform the net about a failure for an SCG RLC bearer: and if the UE is configured with EN-DC:
  2> if SRB3 is configured:
    3> submit the FailureInformation message to lower layers for transmission via SRB3;
  2> else:
    3> submit the FailureInformation message via the EUTRA MCG embedded in E-UTRA RRC message ULInformationTransfer MRDC as specified in TS 36.331 [10]
FailureInformation
The FailureInformation message is used to inform the network about a failure detected by the UE.
Signalling radio bearer: SRB1 or SRB3
RLC-SAP: AM
Logical channel: DCCH
Direction: UE to network

SUMMARY

As a part of developing embodiments herein a problem was identified by the inventors and will first be discussed.

Random access may be performed on either uplink carriers, regular uplink or SUL, configured in System Information Block (SIB)1. For connected UEs, the network may explicitly signal which carrier to use, UL or SUL. Otherwise, the UE selects the SUL carrier if and only if the measured quality of the DL is lower than a broadcasted threshold. Once started, all uplink transmissions of the random access procedure remain on the selected carrier. This behavior will to some extent allow the use of SUL in conditions of poor UL coverage. However, in good DL coverage but poor UL coverage, UE initiated random access will still be performed on the regular uplink in high frequency. Then the UE may encounter random access failure or reach maximum number of RLC retransmissions in the uplink, i.e. RLC failure, which will trigger RLF. If the list of allowed cells of the logical channel includes PCell, the UE will trigger RRC re-establishment, where the UE will try to re-establish the RRC connection, leading to data interruption.

There may be scenarios where there is both poor DL and UL coverage. Then, even if the SUL can be used for failure reporting, the UE may not receive the reconfiguration from the network and thus cannot recover from RLF. Furthermore, if there is no SUL configured, there is no possibility to do any of the above actions mentioned.

Another problem is that in case RRC re-establishment procedure is needed, one of the most time-consuming procedures that the UE needs to perform is the cell (re)selection process. In fact, during such process the UE shall perform cell selection process to find a suitable cell. If the cell selection process fails to find a suitable cell after a complete scan of all RATs and all frequency bands supported by the UE, the UE shall attempt to find an acceptable cell of any PLMN to camp on, trying all RATs that are supported by the UE and searching first for a high-quality cell. Further, when no suitable cells are found, the UE remains/goes in RRC_IDLE. After a certain "back off" period, the UE will re-perform the cell (re)selection process thus continuing consuming more battery.

| FailureInformation message |
|---|
| ```
-- ASN1START
-- TAG-FAILUREINFORMATION-START
FailureInformation ::=            SEQUENCE {
    criticalExtensions                CHOICE {
        failureInformation                FailureInformation-IEs,
        criticalExtensionsFuture          SEQUENCE { }
    }
}
FailureInformation-IEs            SEQUENCE {
    failureInfoRLC-Bearer                 FailureInfoRLC-Bearer   OPTIONAL,
    lateNonCriticalExtension          OCTET STRING                OPTIONAL,
    nonCriticalExtension              SEQUENCE { }                OPTIONAL
}
FailureInfoRLC-Bearer ::=             SEQUENCE {
    cellGroupId                       CellGroupId,
    logicalChannelIdentity            LogicalChannelIdentity,
    failureType                       ENUMERATED {duplication,
                                      spare3, spare2,
spare1}
}
-- TAG-FAILUREINFORMATION-STOP
-- ASN1STOP
``` |

An object of embodiments herein is to improve the performance of a communications network.

According to an aspect of embodiments herein, the object is achieved by a method performed by a User Equipment, UE, for handling Radio Link Failure, RLF, in a wireless communications network. The UE reactivates a deactivated first Secondary Cell, SCell, when an RLF over a Primary Cell, PCell, is detected. The UE then sends an indication to a network node, via the reactivated SCell. The indication indicates any one or more out of the RLF over the PCell, or the reactivated first SCell.

According to another aspect of embodiments herein, the object is achieved by a method performed by a network node for handling Radio Link Failure, RLF, for a User Equipment, UE, in a wireless communications network. The network node receives an indication from the UE via a reactivated SCell, when an RLF over a Primary Cell, PCell, is detected by the UE. The indication indicates any one or more out of the RLF over a PCell, or the reactivated first SCell.

According to an aspect of embodiments herein, the object is achieved by a User Equipment, UE, configured to handle Radio Link Failure, RLF, in a wireless communications network. The UE is further configured to: reactivate a deactivated first Secondary Cell, SCell, when an RLF over a Primary Cell, PCell, is detected. The UE is further configured to send an indication to a network node via the reactivated SCell. The indication is adapted to indicate any one or more out of the RLF over the PCell, or the reactivated first SCell.

According to another aspect of embodiments herein, the object is achieved by a network node e.g. configured to handle Radio Link Failure, RLF, for a User Equipment, UE, in a wireless communications network. The network node is further configured to receive an indication from the UE via a reactivated SCell, when an RLF over a Primary Cell, PCell, is detected by the UE. The indication is adapted to indicate any one or more out of the RLF over a PCell, or the reactivated first SCell.

BRIEF DESCRIPTION OF THE DRAWINGS

Examples of embodiments herein are described in more detail with reference to attached drawings in which:

FIGS. 8 a and b are schematic block diagrams of embodiments herein.
FIGS. 14-17 are flowcharts illustrating methods implemented in a communication system including a host computer, a base station and a user equipment.

DETAILED DESCRIPTION

In embodiments herein, the UE utilizes a form of limited cell re-selection, where the UE first tries to select among the set of deactivated SCells and if one of those SCells is above a certain threshold, the UE activates the SCell configuration.

Next, the UE may apply one of the following:

The UE may send a scheduling request to the reactivated SCell, e.g. if the UE and the network are synchronized. Here, the scheduling request itself may be an implicit indication for the PCell failure and/or SCell reactivation. Having received the scheduling request, the network such as the network node will schedule an uplink grant which the UE may use to send the failure information message and/or report with full information of the failure.

The UE may apply contention free or contention based random access to the reactivated SCell. For contention free random access, the random access itself could be an implicit indication for the PCell failure and/or SCell reactivation. Having received the random access preamble, the network will schedule an uplink grant which the UE can use to send the failure information message/report, or it can be sent after the successful random access procedure.

The UE may send a failure information message and/or report via SUL, if configured, informing the network about the PCell failure and the SCell reactivation.

Next, the UE may receive the reconfiguration to recover from RLF via reactivated SCell.

If the UE is not able to find a suitable cell with the limited cell (re)selection procedure, then the normal RRC re-establishment procedure may be triggered and UE may perform the legacy cell (re)selection procedure as described in 3GPP TS 38.304.

Embodiments herein at least provide the following advantages:

Embodiments herein enable fast RLF recovery by re-activating deactivated SCell upon PCell failure. Thus, the potential service interruption and delays due to the RRC re-establishment procedure are avoided.

Further, the principle of using a limited (re)selection process by scanning only the deactivated serving cells when RRC re-establishment is triggered, may also be applied to other situations that are not necessarily linked to failure of the PCell (e.g., PSCell failure).

Figure 1:
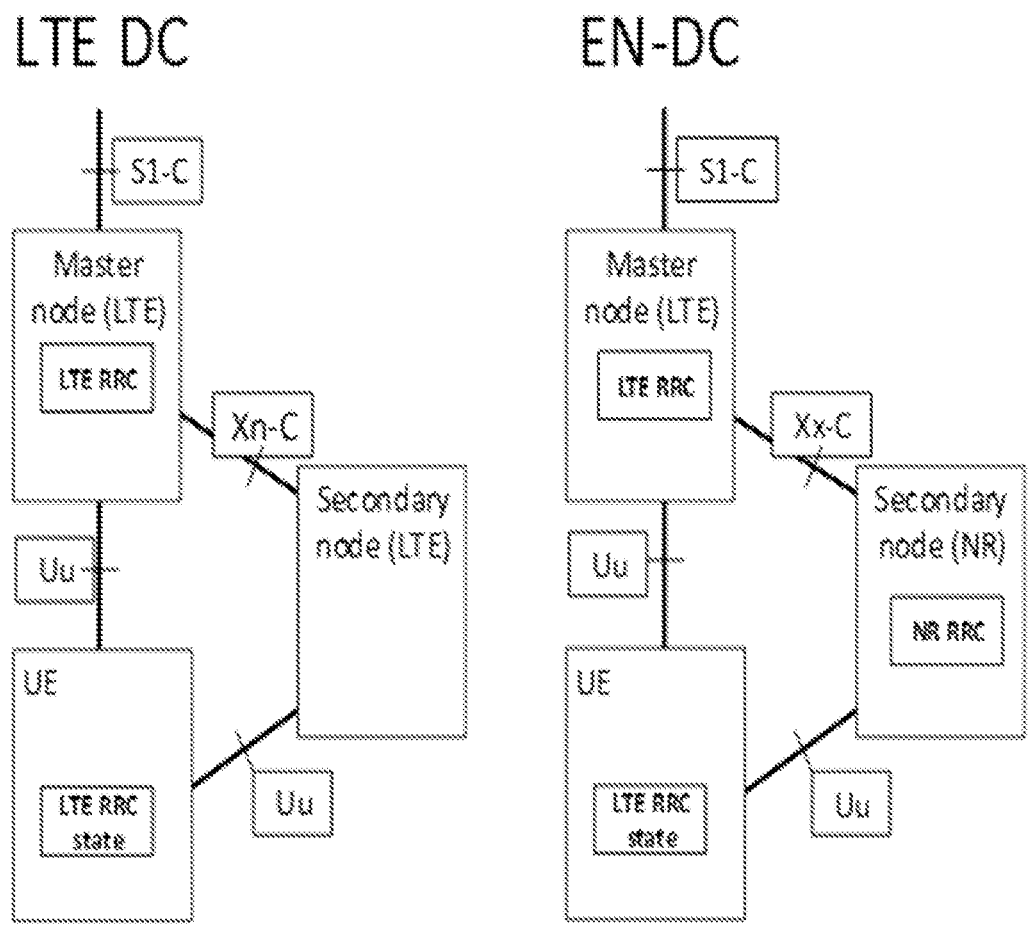
FIG. 1 is a schematic block diagram illustrating prior art.
Figure 2:
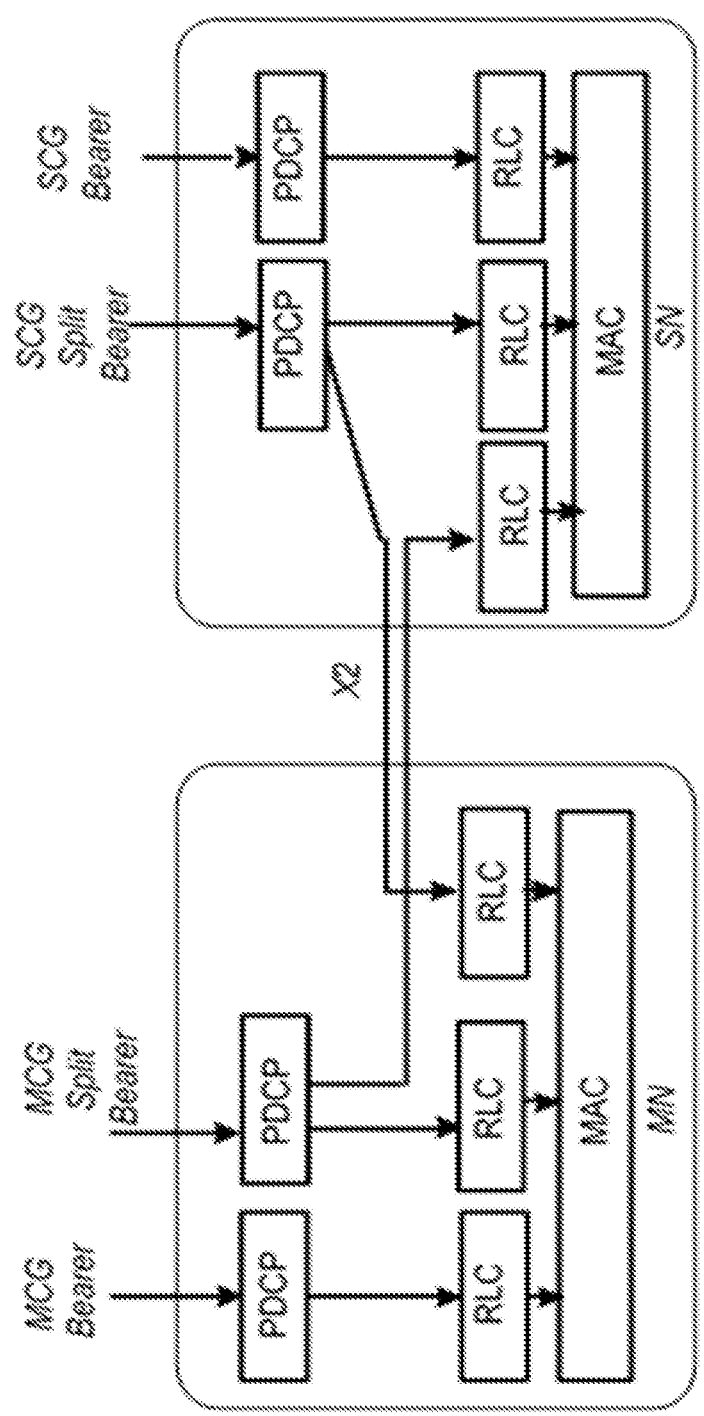
FIG. 2 is a schematic block diagram illustrating prior art.
Figure 3:
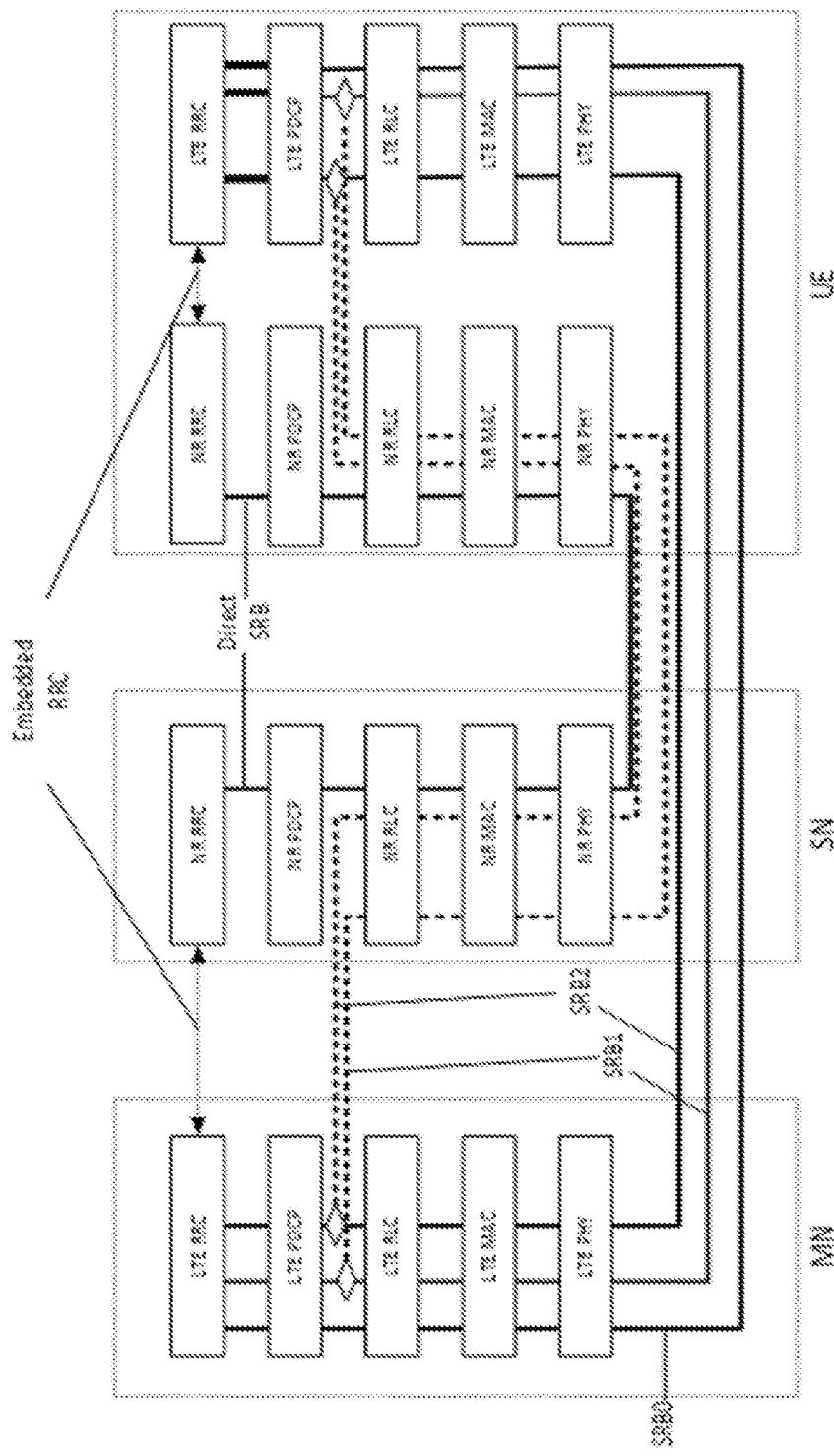
FIG. 3 is a schematic block diagram illustrating prior art.
Figure 4:
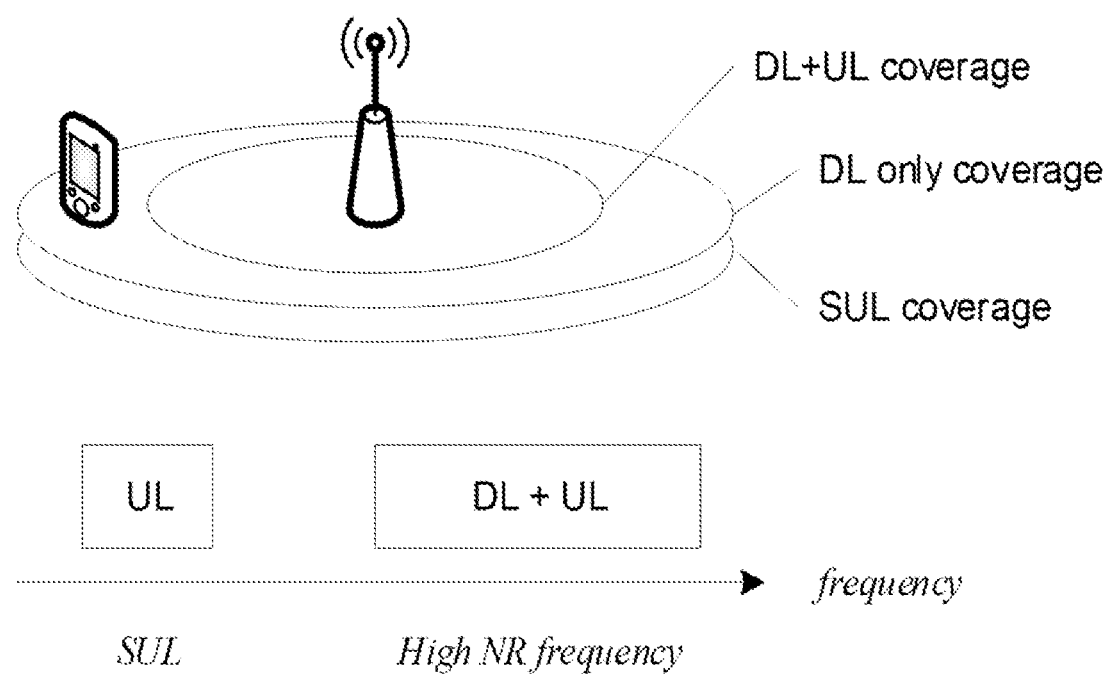
FIG. 4 is a schematic block diagram illustrating prior art.
Figure 5:
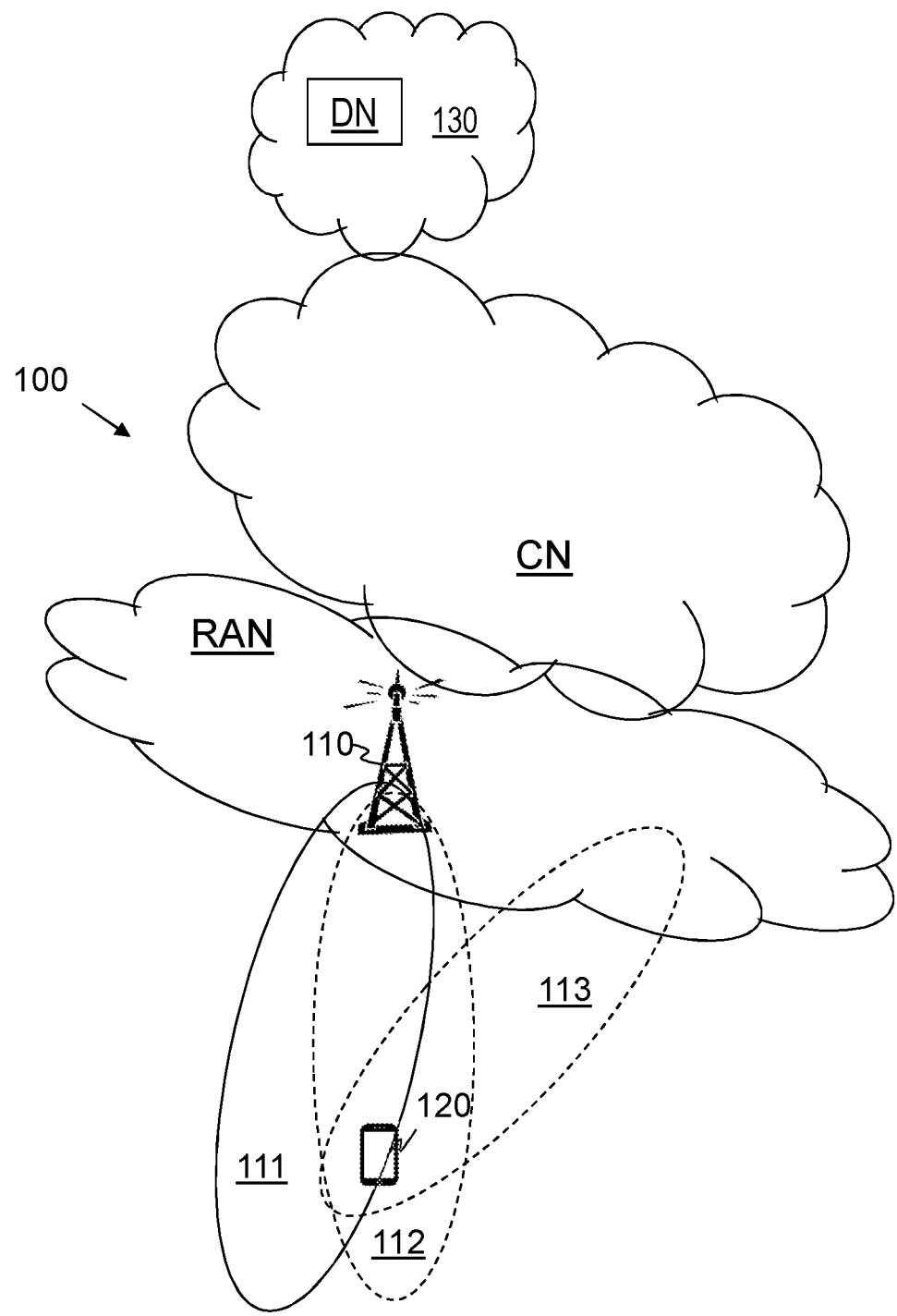
FIG. 5 is a schematic block diagram illustrating embodiments of a wireless communications network.

Embodiments herein relate to wireless communication networks in general. FIG. 5 is a schematic overview depicting a wireless communications network 100. The wireless communications network 100 comprises one or more RANs and one or more CNs. The wireless communications network 100 may use a number of different technologies, such as W-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

A number of network nodes operate in the wireless communications network 100 such as e.g. a network node 110. These nodes provide radio coverage in a number of cells which may also be referred to as a beam or a beam group of beams, such as a Primary cell (PCell) 111 e.g. provided by the network node 110, and one or more Secondary Cells (SCell)s such as a first SCell 112, and a second Scell 113 provided by the network node 110 or any other network node.

The network node 110 may e.g. be acting as a master Node (MN) or an SN when serving a UE 120 in the wireless communications network 100.

The network node 110 may be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the first radio access technology and terminology used. The radio network node 110 may be referred to as a serving radio network node and communicates with a UE 120 with Downlink (DL) transmissions to the UE 120 and Uplink (UL) transmissions from the UE 120.

In the wireless communication network 100, one or more UEs operate, such as e.g. the UE 120. The UE 120 may also referred to as a device, an IoT device, a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may be performed by the UE 120 and the network node 110. As an alternative, a Distributed Node (DN) and functionality, e.g. comprised in a cloud 130 as shown in FIG. 5, may be used for performing or partly performing the methods herein.

The above described problem is addressed in a number of embodiments, some of which may be seen as alternatives, while some may be used in combination.

Figure 6:
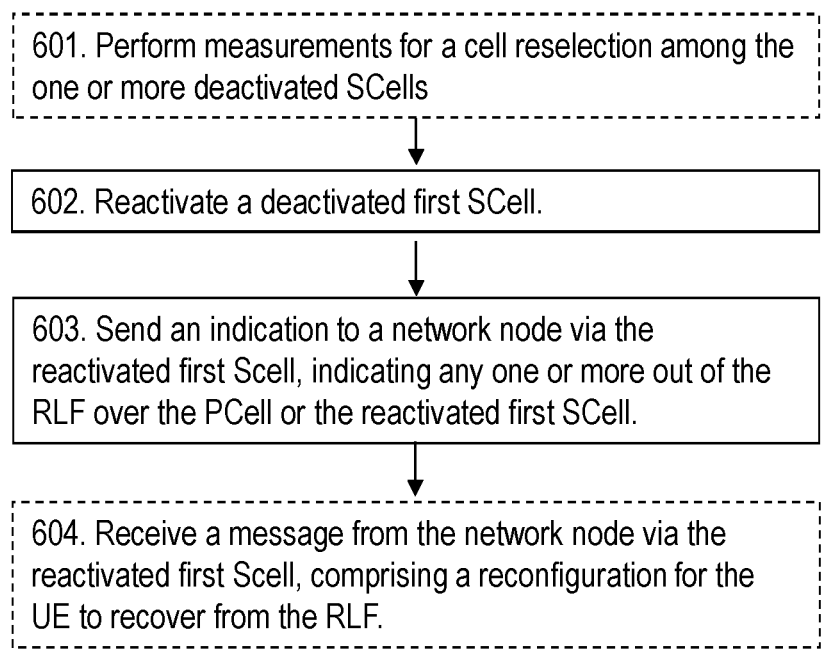
FIG. 6 is a flowchart depicting embodiments of a method in a UE.

FIG. 6 shows example embodiments of a method performed by the UE 120 for handling RLF in the wireless communications network 100. In an example scenario, the UE 120 is configured with one or more deactivated SCells 112, 113 comprising the deactivated first SCell 112. The SCells may be deactivated e.g. to save UE battery. The method first described in a general way, will be described more in detail later on. The method comprises the following actions, which actions may be taken in any suitable order.

Action 601

Upon detecting an RLF on the PCell 111, the UE 120 may in some embodiments perform measurements for a cell reselection among the one or more deactivated SCells 112, 113. The measurements may be used to determine which of the deactivated SCells that is most suitable for signalling the recovery.

Action 602

When an RLF over the PCell 111 is detected, the UE 120 reactivates a deactivated first SCell 112. The UE 120 may perform the reactivation of the deactivated first SCell 112 when the measurement of the deactivated first SCell 112 is above a threshold. A measurement being above the threshold is an indication that SCell signal quality is suitable for signalling the recovery.

Action 603

The UE 120 then sends an indication to a network node 110 via the reactivated SCell. The indication indicates any one or more out of: The RLF over the PCell 111, or the reactivated first SCell 112.

The UE 120 may perform the sending of the indication via a configured Supplementary Uplink (SUL) of the reactivated first SCell 112. SUL may be used if low uplink quality is anticipated based e.g. on the DL SCell measurement result.

The indication may be an implicit indication comprising any one out of: A scheduling request sent to the network node 110, or a random access performed to the network node 110. A scheduling request may be used for the care where the UE 120 has uplink synchronization. In case the UE 120 does not have uplink synchronization, random access may be used.

Alternatively, the indication may relate to the RLF over the PCell 111. The indication may be an explicit indication comprised in a message comprising any one out of: A Radio Resource Control (RRC) message sent in a subsequent uplink grant following a scheduling request sent to the network node 110, or sent to the network node 110, during or after the successful random access procedure the network node 110.

Additionally, the indication may be an explicit indication comprising information related to the RLF over the PCell 111, or the reactivated first SCell 112, comprising any one or more out of: failed cell Identity (ID) failed cell Physical Cell Identity (PCI), failure type, measurements and PCIs of cells measured.

Action 604

The UE 120 may further receive a message from the network node 110 via the reactivated first SCell 112. The message may comprise a reconfiguration for the UE 120 to recover from the RLF. The reconfiguration message may e.g. include a change of the PCell.

Figure 7:
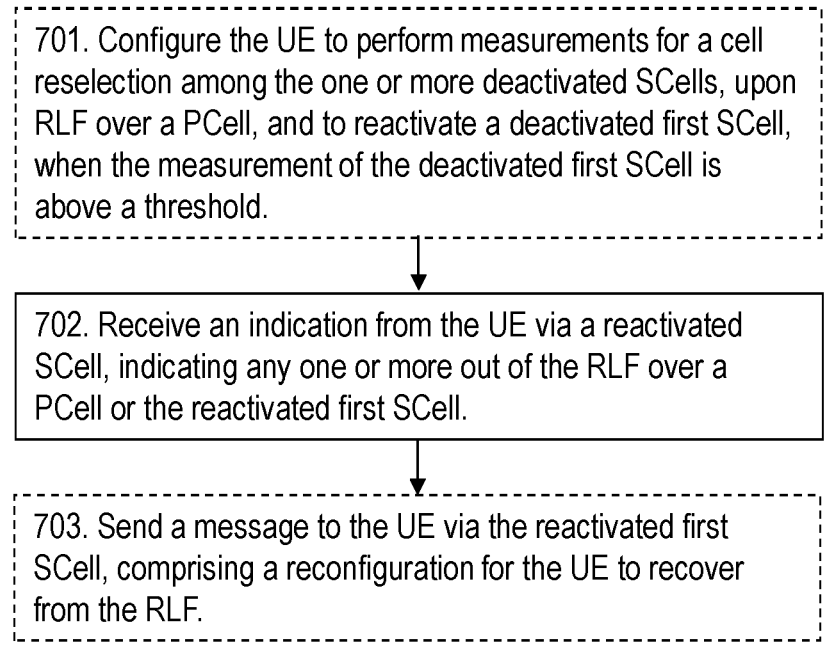
FIG. 7 is a flowchart depicting embodiments of a method in a network node.

FIG. 7 shows example embodiments of a method performed by the network node 110 for handling RLF for the UE 120 in the wireless communications network 100. The UE 120 may be configured by the network node 110 with one or more deactivated SCells 112, 113 comprising the deactivated first SCell 112.

The method comprises the following actions, which actions may be taken in any suitable order.

Action 701

The network node 110 may configure the UE 120 to perform measurements for a cell reselection among the one or more deactivated SCells upon RLF over the PCell 111. The network node 110 may in some embodiments configure the UE 120 to reactivate the deactivated first Scell 112, when the measurement of the deactivated first Scell 112 is above a threshold.

Action 702

When an RLF over a PCell 111 is detected by the UE 120, the network node 110 may receive an indication from the UE 120 via a reactivated Scell 112. The indication indicates any one or more out of the RLF over a PCell or the reactivated first SCell.

The indication may be an implicit indication comprising any one out of: A scheduling request sent from the UE 120, or a random access performed by the UE 120 to the network node 110.

Alternatively, the indication may relate to the RLF over the PCell 111, and may be an explicit indication e.g. comprised in a message comprising any one out of: An RRC message received in a subsequent uplink grant following a scheduling request sent from the UE 120; or received from the UE 120, during or after the successful random access procedure.

Additionally, the indication may be an explicit indication comprising information related to the RLF over the PCell 111, or the reactivated first SCell 112, comprising any one or more out of: Failed cell ID, failed cell PCI, failure type, measurements and PCIs of cells measured.

Action 703

The network node 110 may send a message to the UE 120 via the reactivated first SCell 112. The message may comprise a reconfiguration for the UE 120 to recover from the RLF.

The network node 110 may send the indication via a configured SUL of the reactivated first SCell 112.

The above embodiments will now be further explained and exemplified below.

According to example of embodiments herein, consider a scenario when the UE 120 is configured with one or more deactivated SCell(s) 112, 113 and experiences poor PCell 111 coverage in both DL and UL. The scenario may refer to standalone (SA) or dual connectivity (DC) deployments where the MCG is NR. Further it is noted that, the limited (re)selection process to be referred herein may be used during the normal RRC re-establishment procedure. If such (re)selection process fails, then the UE 120 may use the legacy (re)selection process.

In some first embodiments, if the UE 120 detects RLF on the PCell 111, the UE 120 utilizes the limited cell re-selection. Accordingly, UE 120 first tries to select an SCell among the set of deactivated SCells 112, 113 e.g. based on the reference signal measurements in DL. These measurements may refer to signal strength such as RSRP or signal quality e.g., SINR, RSRQ. If one of the deactivated SCells 112, 113 is above a certain threshold, UE 120 may (re-)activate the SCell configuration autonomously i.e., without receiving an explicit indication, which comes via MAC Control Element (CE), from the network such as the network node 110.

In some second embodiments, UE 120 sends a scheduling request on the reactivated SCell 112, if the UE 120 and the network are synchronized and the reactivated SCell is configured with PUCCH (PUCCH SCell). Here, the scheduling request itself may be an implicit indication for the PCell 111 failure and/or SCell 112 reactivation.

Also, the UE 120 may send PCell 111 failure information in an RRC message/report using the subsequent uplink grant following the scheduling request. The failure information message may include information like, failed cell ID/Physical Cell Identity (PCI), failure type, and measurements and PCIs of the cells measured.

As alternative to the second embodiments, UE 120 may apply contention free random access to the reactivated SCell 112, if a contention-free resource is available for the UE 120. Here the random access itself may be an implicit indication for the PCell 111 failure and/or SCell 112 reactivation. Also, the PCell 111 failure information message and/or report may be sent during or after the successful random access procedure. E.g. if the uplink grant following the uplink preamble is sufficiently large, the UE 120 may transmit the PCell 111 failure information there, or if it does not fit the grant it may be transmitted after the completion of the random access procedure. In this embodiment, it is faster to continue communication if the UE 120 has a dedicated random access preamble, e.g. sequence, given for the SCell 112, i.e., there is no contention resolution and the dedicated preamble could be an implicit indicator. If such dedicated random access preamble is not available, the UE 120 may also use contention based random access to transmit the PCell 111 failure information message and/or report. The failure information message may include information like, failed cell ID/PCI, failure type, UE 120 ID/Cell Radio Network Temporary Identifier (C-RNTI) and measurements and PCIs of the cells measured. For the contention based case, if the recovery is triggered in the reactivated SCell 112, the UE 120 may have a dedicated C-RNTI in that cell. Then UE 120 may include that C-RNTI MAC CE in message 3 to resolve the contention, i.e. L3 contention resolution may not be needed.

As another alternative to the second embodiments, the UE 120 sends PCell 111 failure information message and/or report via SUL if configured, informing the network about the PCell 111 failure and the SCell 112 reactivation. In case the SCell 112 that the UE 120 selects is not configured with SUL, the UE 120 may also utilize the SUL of another SCell to transmit the PCell 111 failure Information message/report. In this case, in order to inform the network such as the network node 110 via which SCell the reconfiguration would be sent to the UE 120, the UE 120 may send SCell ID or SCell index via SUL within and/or while and/or after reporting PCell 111 failure.

In some further embodiments, the failure information message to be sent via the SUL carrier may be enhanced to include the latest available measurements and/or failure type. In one of the further embodiments, the UE 120 may, before sending the failure information over the SUL carrier, perform the random access according to the SUL Random Access Channel RACH parameters e.g., broadcasted within the SIB1. In particular, if the UE 120 has been allocated with contention-free random access resource, the UE 120 may perform the contention-free random access to initiate the SUL carrier switch. If the UE 120 has not been allocated with a contention-free resource, UE 120 may perform the contention-based random access to initiate the SUL carrier switch.

In some other embodiments, the principles described in the above embodiments may be applied without any loss of meaning also to when the failure is experienced on the PCell SCell (PSCell). The wording PSCell is used to cover also the case of RLF on PSCell, which is the primary cell of the Secondary Cell Group (SCG). In this case, the SCell on which the UE 120 tries to send the failure information may belong to a master cell group or secondary cell group. A master cell group and secondary cell group when used herein means the cell groups managed by the master and the secondary nodes respectively.

Yet, in another embodiment, when the failure is experienced on the PSCell 111, the SCell on which the UE 120 tries to send the failure information has to belong only to the secondary cell group.

PCell and PSCell are not the same. PSCell is the primary cell of the secondary cell group (SCG) whereas PCell is the primary cell of the master cell group (MCG).

MCG and SCG refer to master and secondary cell groups respectively. MCG is the group of serving cells for a UE under the master node and comprised of primary cell (PCell) and SCells typically each of them operate at different bands.

SCG is the group of serving cells for a UE under the secondary node and comprised of primary cell of SCG (PSCell) and SCells typically each of them operate at different bands. Each UE may have different groups of MCG and SCG cells.

MCG=PCell+SCells (all under master node)
SCG=PSCell+SCells (all under secondary node)

There is no primary cell group There is a primary cell (PCell) which is the primary cell of the master node; or primary cell of the secondary node (PSCell) i.e., Primary Secondary Cell. There are master and secondary cell groups as defined above.

If none of the above embodiments is feasible, then the UE 120 may fall back to the RRC re-establishment procedure.

FIG. 8 shows PCell 111 fails and the failure indication and/or report is sent over the SCell 112, shown in FIG. 8a) and the SUL shown in FIG. 8b).

In some third embodiments, UE 120 receives an RRC message to recover from RLF via the reactivated SCell 112. Here, the RRC message may simply be an RRC reconfiguration message, e.g. a reconfiguration With Synchronization, configuring a new PCell for the UE 120.

In some further embodiments, if any of the existing MR-DC options are enabled (EN-DC, NGEN-DC, NE-DC or NR-DC), upon receiving a failure indication, the network such as the network node 110 may generate the RRC messages and send it via split SRB/SRB3 to the UE 120, in case UE 120 is still reachable on one of the cell groups. Split SRB/SRB3 when used herein means either SRB1/2 configured as split SRB or SRB3.

Split SRB refers to the signaling bearer where the control plane message (e.g., RRC message) can be exchanged through either/both MCG/SCG lower layers (PHY and MAC) typically via PCell/PSCell. The higher layer termination of Split SRB1/SRB2 is in the master node.

SRB3 refers to the signaling radio bearer where the control plane message (e.g., RRC message) can be exchanged through the SCG lower layers (PHY and MAC)—typically via PSCell. The higher layer termination of SRB3 is in the secondary node.

Yet, in some other embodiments, if MR-DC is enabled, the MN such as the network node 110 may send an indication to the SN such as the network node providing the SCell 113, by requesting a certain RRC procedure to be performed, e.g., handover, reconfiguration, or re-establishment. In some other embodiments, if MR-DC is enabled, the MN such as the network node 110, may forward such message to the SN, i.e., via inter-node RRC message, and the SN decides itself what actions to perform.

In embodiments herein, the existing triggers for RLF may be reused as in 3GPP TS 38.331 section 5.3.10.3 named Detection of radio link failure. In one embodiment, the triggers for RLF are the same as defined in TS 38.331 section 5.3.10.3 Detection of radio link failure. These include an RLF detected upon the maximum number of RLC retransmissions has been reached. Alternatively, the radio link problem such as the RLF may be detected if the measured RSRP is too low given a related threshold, or upon the fail to decode PDCCH and/or PDSCH due to low power signal quality, e.g., low RSRP, Reference Signal Received Quality (RSRQ). Further, the radio link problem is detected upon receiving N out of indications from the lower layers similar to RLF/Radio Link Monitoring (RLM) procedure in LTE or upon receiving indication from the MAC that random access has failed.

Figure 9:
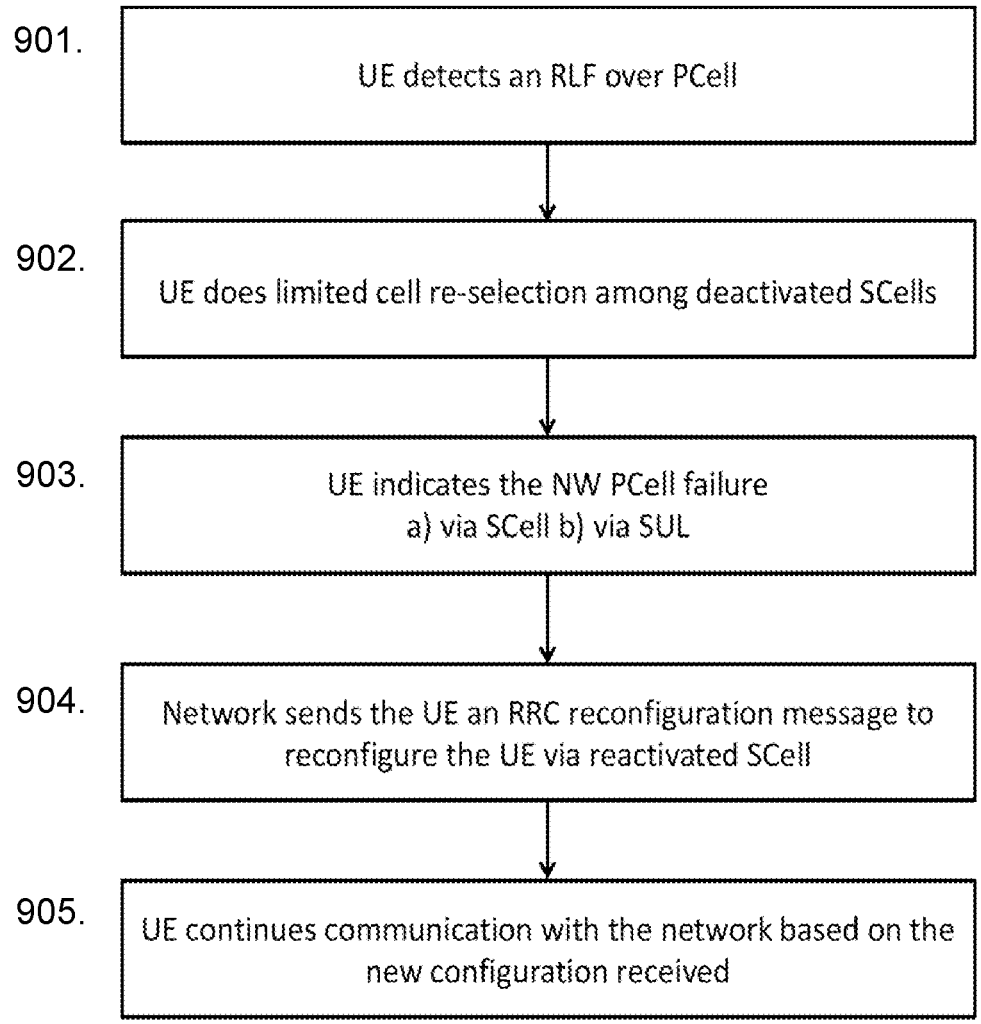
FIG. 9 is a flow chart depicting embodiments of a method in a wireless communications network.

FIG. 9 depicts a flow-chart according to an example of the embodiments herein. In FIG. 9, the UE 120 is referred to as UE, and the network node 110 is referred to as network.

Action 901. The UE 120 detects RLF over the PCell 111.

Action 902. The UE 120 performs limited cell re-selection among deactivated SCells 112, 113.

Action 903. The UE 120 indicates to the Network (NW) PCell failure such as the RLF a) via the SCell or b) via the SUL.

Action 904. The network node 110 sends to the UE 120, an RRC reconfiguration message to reconfigure the UE 120 vi the reactivated SCell 112.

Action 905. The UE 120 continues communication with the network such as the network node 110 based on the new configuration received.

Embodiments herein aim to enable a fast PCell 111 recovery procedure by re-activating a deactivated SCell 112 if the deactivated SCell fulfils a certain criterion, such as signal strength and/or quality.

To perform the method actions above, the UE 120 is configured to handle RLF in a wireless communications network 100. The UE 120 may comprise an arrangement depicted in FIGS. 10a and 10b.

The UE 120 may comprise an input and output interface 1000 configured to communicate with network nodes such as the network node 110. The input and output interface 1000 may comprise a wireless receiver (not shown) and a wireless transmitter (not shown).

The UE 120 is further be configured to, e.g. by means of a reactivating unit 1010 in the UE 120, when an RLF over a PCell is detected, reactivate a deactivated first Scell 112.

The UE 120 is further be configured to, e.g. by means of a sending unit 1020 in the UE 120, send, via the reactivated SCell, an indication to a network node 110, which indication is adapted to indicate any one or more out of, the RLF over the PCell 111, or the reactivated first SCell 112.

The UE 120 may further be configured to, e.g. by means of a receiving unit 1030 in the UE 120, receive, via the reactivated first SCell, a message from the network node 110. The message is adapted to comprise a reconfiguration for the UE 120 to recover from the RLF.

In some embodiments, the UE 120 is further configured with one or more deactivated SCells 112, 113 comprising the deactivated first SCell 112. In these embodiments, the UE 120 may further be configured to, e.g. by means of a performing unit 1040 in the UE 120, perform measurements for a cell reselection among the one or more deactivated SCells 112, 113.

In these embodiments, the UE 120 may further be configured to, e.g. by means of the reactivating unit 1010 in the UE 120, reactivate the deactivated first SCell 112, when the measurement of the deactivated first SCell is above a threshold.

The indication may be adapted to be an implicit indication configured to comprise any one out of:
a scheduling request sent to the network node 110, or
a random access performed to the network node 110.

The indication may further be configured to relate to the RLF over the PCell 111, and may be adapted to be an explicit indication configured to be comprised in a message. The message may comprise any one out of:
A Radio Resource Control, RRC, message configured to be sent in a subsequent uplink grant following a scheduling request sent to the network node 110, or configured to be sent to the network node 110, during or after the successful random access procedure to the network node 110.

Alternatively, the indication may be adapted to be an explicit indication configured to comprise information related to the RLF over the PCell 111, or the reactivated first SCell 112, further being configured to comprise any one or more out of: failed cell Identity, ID, failed cell Physical Cell Identity (PCI) failure type, measurements and PCIs of cells measured.

In some embodiments, The UE 120 may be configured to send the indication via a configured Supplementary Uplink (SUL) of the reactivated first SCell 112.

Figure 10A:
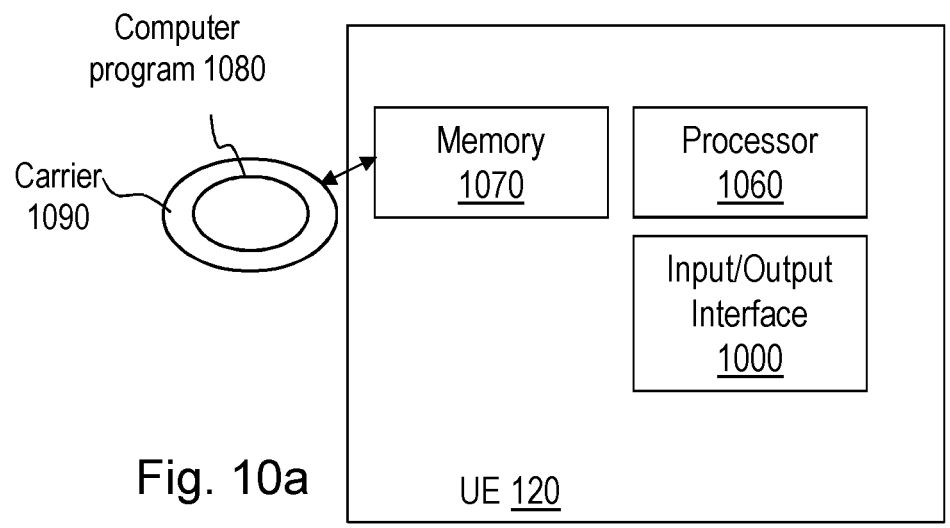
FIGS. 10 a and b are schematic block diagrams illustrating embodiments of a UE.
Figure 10B:
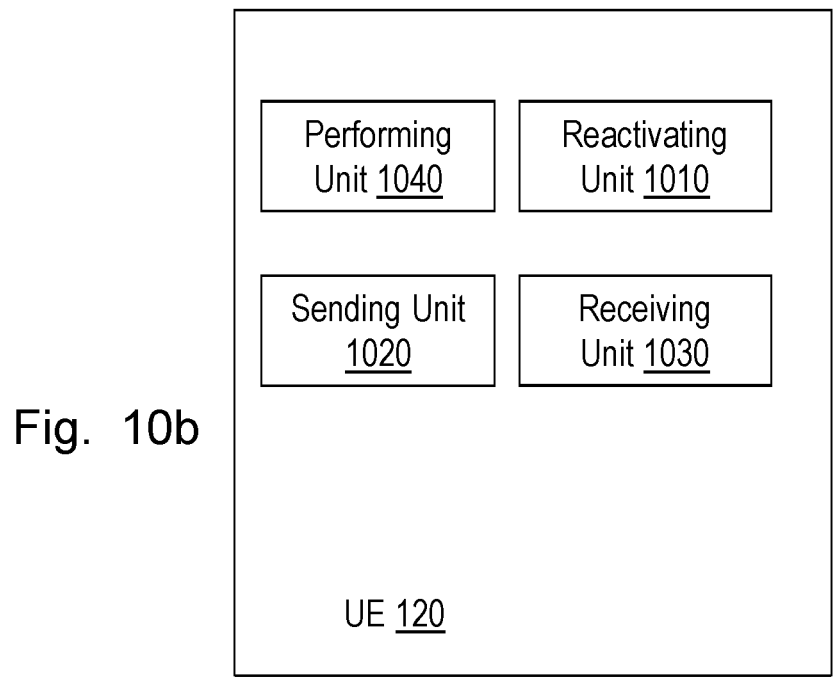

The embodiments herein may be implemented through a respective processor or one or more processors, such as the processor 1060 of a processing circuitry in the UE 120 depicted in FIG. 10*a*, together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory 1070 comprising one or more memory units. The memory 1070 comprises instructions executable by the processor in UE 120. The memory 1070 is arranged to be used to store e.g. information, indications, data, configurations, and applications to perform the methods herein when being executed in the UE 120.

In some embodiments, a computer program 1080 comprises instructions, which when executed by the respective at least one processor 1060, cause the at least one processor of the UE 120 to perform the actions above.

In some embodiments, a respective carrier 1090 comprises the respective computer program 1080, wherein the carrier 1090 is one of an electronic signal, an optical signal, an electromagnetic signal, a magnetic signal, an electric signal, a radio signal, a microwave signal, or a computer-readable storage medium.

Those skilled in the art will appreciate that the units in the UE 120 described above may refer to a combination of analog and digital circuits, and/or one or more processors configured with software and/or firmware, e.g. stored in the UE 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

To perform the method actions above, the network node 110 is configured to handle RLF for the UE 120 in a wireless communications network 100. The network node 110 may comprise an arrangement depicted in FIGS. 11*a* and 11*b*.

The network node 110 may comprise an input and output interface 1100 configured to communicate with other network nodes and UEs, such as the UE 120. The input and output interface 1100 may comprise a wireless receiver (not shown) and a wireless transmitter (not shown).

The network node 110 may further be configured to, e.g. by means of a receiving unit 1110 in the network node 110, receive an indication from the UE 120 via a reactivated SCell 120, when an RLF over a Primary Cell, PCell, 111 is detected by the UE 120. The indication is adapted to be configured to indicate any one or more out of, the RLF over a PCell 111, or the reactivated first SCell 112.

The network node 110 may be further being configured to, e.g. by means of a sending unit 1130 in the network node 110, send a message to the UE 120 via the reactivated first SCell. The message may be adapted to be configured to comprise a reconfiguration for the UE 120 to recover from the RLF.

The UE 120 may be configured to be configured by the network node 110 with one or more deactivated SCells 112, 113 comprising the deactivated first SCell 112.

The network node may further be configured to configure, e.g. by means of a configuring unit 1120 in the network node 110, the UE 120 to perform measurements for a cell reselection among the one or more deactivated SCells 112, 113, upon RLF over a PCell 111, and to reactivate a deactivated first SCell 112, when the measurement of the deactivated first SCell 112 is above a threshold.

The indication may be adapted to be configured to be an implicit indication comprising any one out of:
a scheduling request sent from the UE 120, or
a random access performed by the UE 120 to the network node 110.

Alternatively, the indication may be adapted to be configured to relate to the RLF over the PCell 111, and may be adapted to be configured to be an explicit indication comprised in a message comprising any one out of:
a Radio Resource Control, RRC, message configured to be received in a subsequent uplink grant following a scheduling request configured to be sent from the UE 120, or configured to be received from the UE 120, during or after the successful random access procedure.

The network node 110 may further be configured to send the indication, e.g. by means of a sending unit 1130 in the network node 110, via a configured Supplementary Uplink, SUL, of the reactivated first SCell 112.

The indication may further be adapted to be configured to be an explicit indication configured to comprise information related to the RLF over the PCell 111, or the reactivated first SCell 112, configured to comprise any one or more out of: failed cell Identity, ID, failed cell Physical Cell Identity, PCI, failure type, measurements and PCIs of cells measured.

Figure 11A:
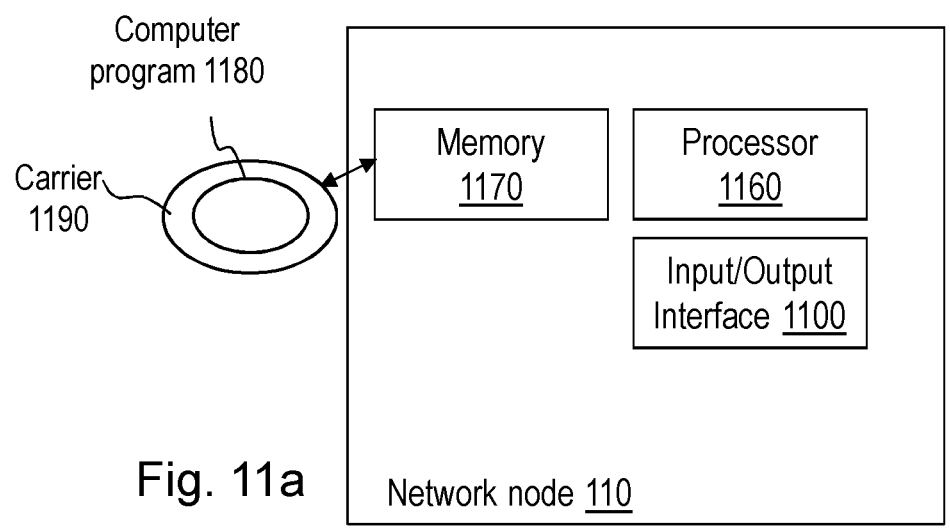
FIGS. 11 a and b are schematic block diagrams illustrating embodiments of a network node.
Figure 11B:
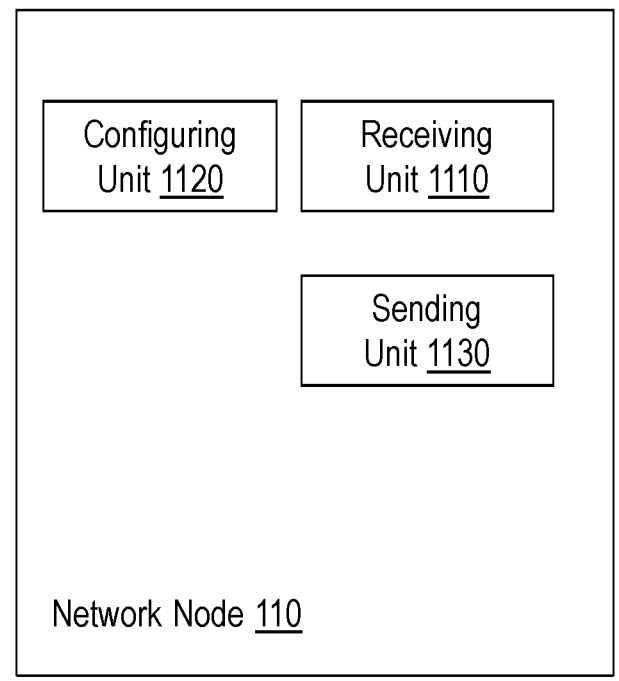

The embodiments herein may be implemented through a respective processor or one or more processors, such as the processor 1160 of a processing circuitry in the network node 110 depicted in FIG. 11*a*, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 1170 comprising one or more memory units. The memory 1170 comprises instructions executable by the processor in network node 110. The memory 1170 is arranged to be used to store e.g. information, indications, data, configurations, and applications to perform the methods herein when being executed in the network node 110.

In some embodiments, a computer program 1180 comprises instructions, which when executed by the respective at least one processor 1160, cause the at least one processor of the network node 110 to perform the actions above.

In some embodiments, a respective carrier 1190 comprises the respective computer program 1180, wherein the carrier 1190 is one of an electronic signal, an optical signal, an electromagnetic signal, a magnetic signal, an electric signal, a radio signal, a microwave signal, or a computer-readable storage medium.

Those skilled in the art will appreciate that the units in the network node 110 described above may refer to a combination of analog and digital circuits, and/or one or more processors configured with software and/or firmware, e.g. stored in the network node 110, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 12:
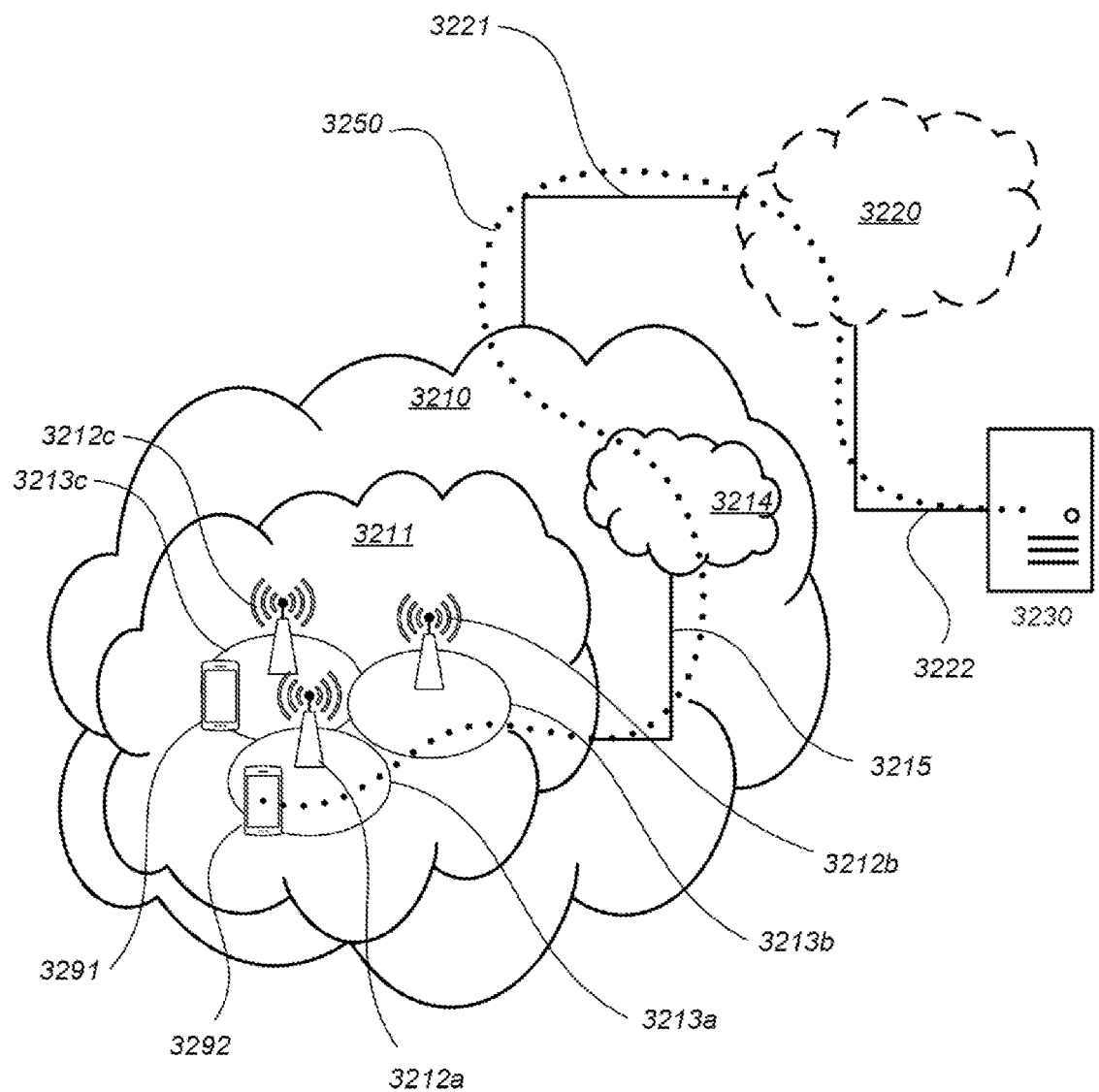
FIG. 12 schematically illustrates a telecommunication network connected via an intermediate network to a host computer.

With reference to FIG. 12, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries.

The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 13) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 13 may be identical to the host computer 3230, one of the base stations 3212*a*, 3212*b*, 3212*c* and one of the UEs 3291, 3292 of FIG. 12, respectively. This is to say, the inner workings of these entities may be as shown in FIG. 13 and independently, the surrounding network topology may be that of FIG. 12.

Figure 13:
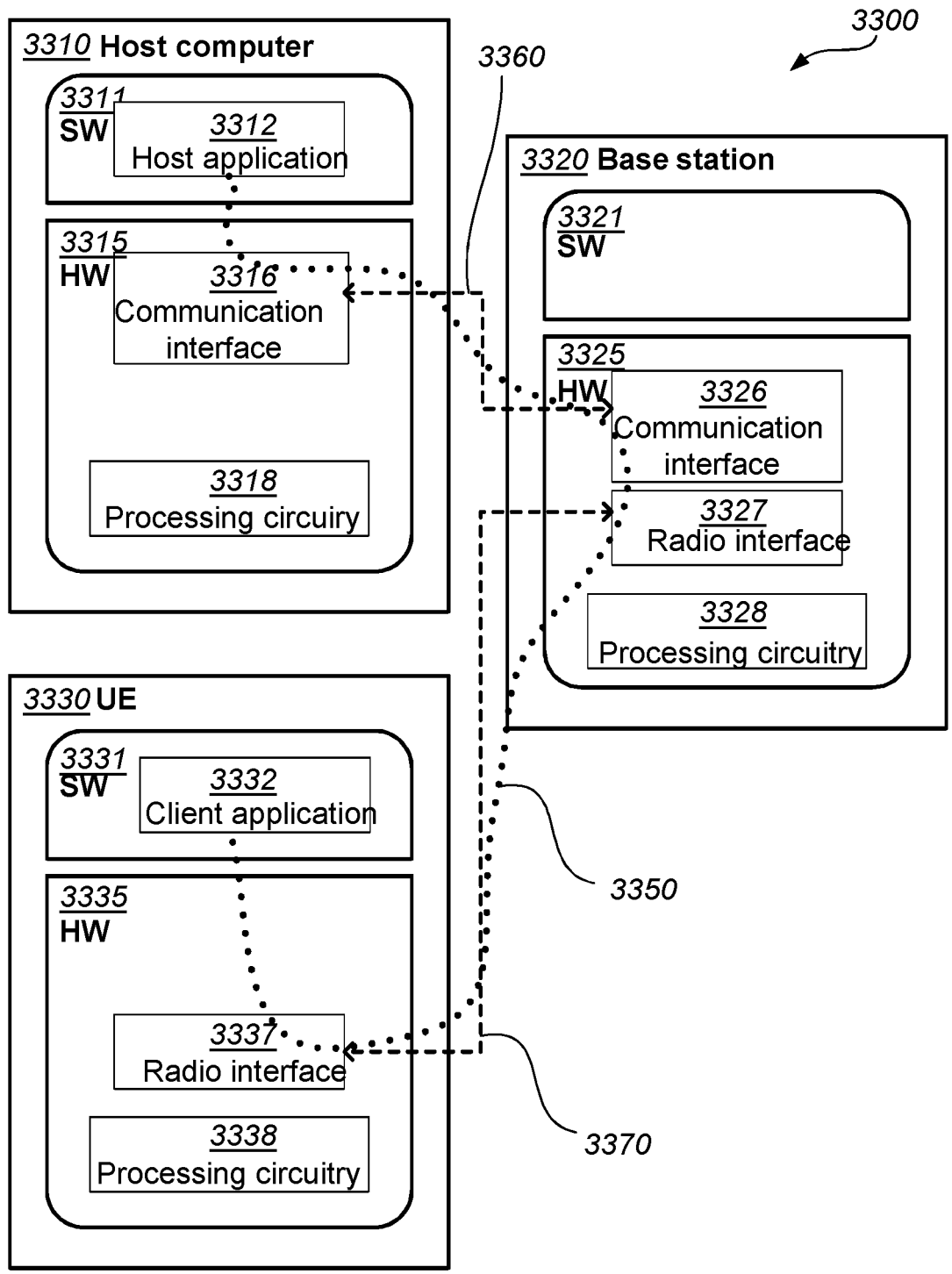
FIG. 13 is a generalized block diagram of a host computer communicating via a base station with a user equipment over a partially wireless connection.

In FIG. 13, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the [select the applicable RAN effect: data rate, latency, power consumption] and thereby provide benefits such as [select the applicable corresponding effect on the OTT service: reduced user waiting time, relaxed restriction on file size, better responsiveness, extended battery lifetime].

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 14 is a flowchart illustrating a method implemented in a communication system, in accordance with one embodiment. The communication system includes a host computer, a base station such as an AP STA, and a UE such as a Non-AP STA which may be those described with reference to FIG. 12 and FIG. 13. For simplicity of the present disclosure, only drawing references to FIG. 14 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 15 is a flowchart illustrating a method implemented in a communication system, in accordance with one embodiment. The communication system includes a host computer, a base station such as an AP STA, and a UE such as a Non-AP STA which may be those described with reference to FIG. 12 and FIG. 13. For simplicity of the present disclosure, only drawing references to FIG. 15 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 16:
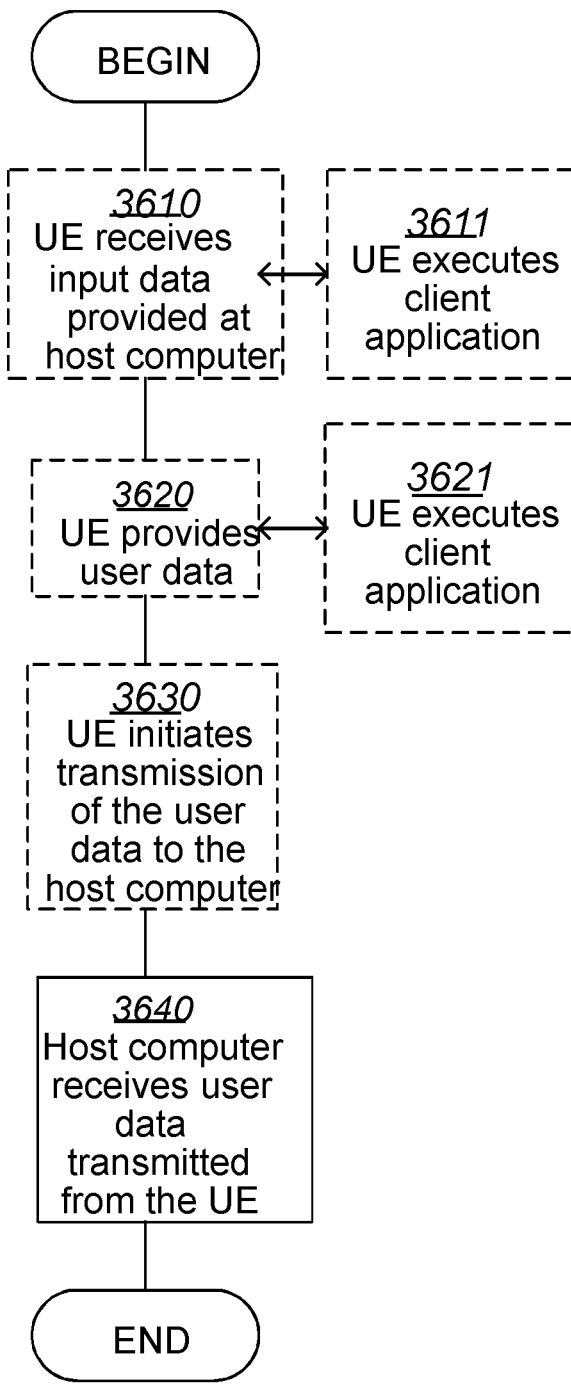

FIG. 16 is a flowchart illustrating a method implemented in a communication system, in accordance with one embodiment. The communication system includes a host computer, a base station such as an AP STA, and a UE such as a Non-AP STA which may be those described with reference to FIG. 12 and FIG. 13. For simplicity of the present disclosure, only drawing references to FIG. 16 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 17:
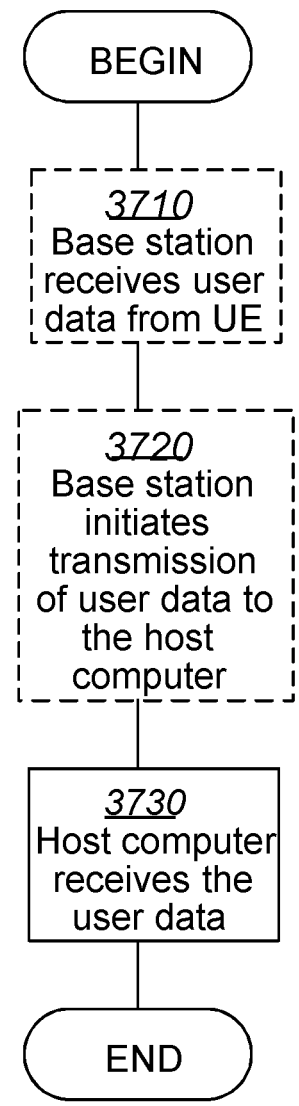

FIG. 17 is a flowchart illustrating a method implemented in a communication system, in accordance with one embodiment. The communication system includes a host computer, a base station such as an AP STA, and a UE such as a Non-AP STA which may be those described with reference to FIG. 12 and FIG. 13. For simplicity of the present disclosure, only drawing references to FIG. 17 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

| Abbreviation | Explanation |
| --- | --- |
| ACK | Acknowledgement |
| AP | Application Protocol |
| BSR | Buffer Status Report |
| BWP | Bandwidth Part |
| C-RNTI | Cell Radio Network Temporary Identifier |
| CA | Carrier Aggregation |
| CE | Control Element |
| CP | Control Plane |
| CQI | Channel Quality Indicator |
| DC | Dual Connectivity |
| DCI | Downlink Control Information |
| DL | Downlink |
| DRB | Data Radio Bearer |
| eNB | (EUTRAN) base station |
| E-RAB | EUTRAN Radio Access Bearer |
| FDD | Frequency Division Duplex |
| gNB | NR base station |
| GTP-U | GPRS Tunnelling Protocol - User Plane |
| IP | Internet Protocol |
| LTE | Long Term Evolution |
| MCG | Master Cell Group |
| MAC | Medium Access Control |
| MeNB | Master eNB |
| MgNB | Master gNB |
| MN | Master Node |
| NACK | Negative Acknowledgement |
| NR | New Radio |
| PDCP | Packet Data Convergence Protocol |
| PCell | Primary Cell |
| PCI | Physical Cell Identity |
| PSCell | Primary SCell |
| PUSCH | Physical Uplink Shared Channel |
| RLC | Radio Link Control |
| RLF | Radio Link Failure |
| RRC | Radio Resource Control |
| SCell | Secondary Cell |
| SCG | Secondary Cell Group |
| SCTP | Stream Control Transmission Protocol |
| SeNB | Secondary eNB |
| SINR | Signal to Interference plus Noise Ratio |
| SN | Secondary Node |
| SR | Scheduling Request |
| SRB | Signaling Radio Bearer |
| SUL | Supplementary uplink |
| TDD | Time Division Duplex |
| TEID | Tunnel Endpoint IDentifier |
| TNL | Transport Network Layer |
| UCI | Uplink Control Information |
| UDP | User Datagram Protocol |
| UE | User Equipment |
| UL | Uplink |

-continued

| Abbreviation | Explanation |
| --- | --- |
| UP | User Plane |
| URLLC | Ultra Reliable Low Latency Communication |
| X2 | Interface between base stations |

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a User Equipment (UE) for handling Radio Link Failure (RLF) in a wireless communications network, the method comprising:
   when an RLF over a Primary Cell (PCell) is detected, reactivating a deactivated first Secondary Cell (SCell); and
   sending an indication to a network node via a configured Supplementary Uplink (SUL) of the reactivated first SCell or of a second SCell, wherein the indication indicates the RLF over the PCell and the reactivated first SCell.

2. The method according to claim 1, further comprising receiving a message from the network node via the reactivated first SCell, wherein the message comprises a reconfiguration of the UE to facilitate recovery from the RLF.

3. The method according to claim 1, wherein:
   the UE is configured with one or more deactivated SCells including the deactivated first SCell;
   the method further comprises performing measurements of the deactivated SCells to support a cell reselection among the deactivated SCells; and
   reactivating the deactivated first SCell is performed based on the measurement of the deactivated first SCell being above a threshold.

4. The method according to claim 1, wherein the indication is an implicit indication comprising one of the following:
   a scheduling request sent to the network node, or
   a random access performed by the UE toward the network node.

5. The method according to claim 1, wherein the indication is an explicit indication of the RLF over the PCell, and wherein the indication is included in one of the following:
   a Radio Resource Control (RRC) message sent in uplink resources that were granted by the network node in response to a scheduling request sent by the UE, or
   a message sent to the network node during or after a successful random access procedure by the UE toward the network node.

6. The method according to claim 1, wherein the indication is an explicit indication comprising one or more of the following:
   failed cell Identity (ID),
   failed cell Physical Cell Identity (PCI),
   failure type, and
   measurements and PCIs of cells measured.

7. A User Equipment (UE) configured to handle Radio Link Failure (RLF) in a wireless communications network, the UE comprising:
   interface circuitry configured to communicate via a Primary Cell (PCell) and one or more Secondary Cells (SCell); and processing circuitry operably coupled to the interface circuitry, whereby the processing circuitry and interface circuitry are configured to perform operations corresponding to the method of claim 1.

8. The UE of claim 7, wherein the processing circuitry and interface circuitry are further configured to receive a message from the network node via the reactivated first SCell, wherein the message comprises a reconfiguration of the UE to facilitate recovery from the RLF.

9. The UE of claim 7, wherein:
the UE is configured with one or more deactivated SCells including the deactivated first SCell;
the processing circuitry and interface circuitry are further configured to perform measurements of the deactivated SCells to support a cell reselection among the deactivated SCells; and
the processing circuitry and interface circuitry are configured to reactivate the deactivated first SCell based on the measurement of the deactivated first SCell being above a threshold.

10. A non-transitory, computer-readable medium storing computer-executable instructions that, when executed by a processor of a user equipment (UE), configures the UE to perform operations corresponding to the method of claim 1.

11. A method performed by a network node for handling Radio Link Failure (RLF) of a User Equipment (UE) in a wireless communications network, the method comprising:
in response to a RLF over a Primary Cell (PCell) being detected by the UE, receiving an indication from the UE via a configured Supplementary Uplink (SUL) of the reactivated first SCell or of a second SCell, wherein the indication indicates the RLF over the PCell and the reactivated first SCell.

12. The method according to claim 11, further comprising sending a message to the UE via the reactivated first SCell, wherein the message comprises a reconfiguration of the UE to facilitate recovery from the RLF.

13. The method according to claim 11, wherein:
the UE is configured with one or more deactivated SCells including the deactivated first SCell; and
the method further comprises configuring the UE to:
perform measurements of the deactivated SCells to support a cell reselection among the deactivated SCells, and
reactivate the deactivated first SCell when the measurement of the deactivated first SCell is above a threshold.

14. The method according to claim 11, wherein the indication is an implicit indication comprising one of the following:
a scheduling request received from the UE, or
a random access performed by the UE toward the network node.

15. The method according to claim 11, wherein the indication is an explicit indication of the RLF over the PCell, and wherein the indication is included in one of the following:
a Radio Resource Control (RRC) message received in uplink resources that were granted by the network node in response to a scheduling request sent by the UE, or
a message sent to the network node during or after a successful random access procedure by the UE toward the network node.

16. The method according to claim 11, wherein the indication is an explicit indication comprising one or more of the following:
failed cell Identity (ID),
failed cell Physical Cell Identity (PCI),
failure type, and
measurements and PCIs of cells measured.

17. A network node configured to handle Radio Link Failure (RLF) for a User Equipment (UE) in a wireless communications network, the network node comprising:
interface circuitry configured to communicate with the UE via one or more of the following: a Primary Cell (PCell) and one or more Secondary Cells (SCell); and
processing circuitry operably coupled to the interface circuitry, whereby the processing circuitry and interface circuitry are configured to perform operations corresponding to the method of claim 11.

18. The network node of claim 17, the processing circuitry and interface circuitry are further configured to send a message to the UE via the reactivated first SCell, wherein the message comprises a reconfiguration of the UE to facilitate recovery from the RLF.

19. The network node of claim 17, wherein:
the UE is configured with one or more deactivated SCells including the deactivated first SCell; and
the processing circuitry and interface circuitry are further arranged to configure the UE to:
perform measurements of the deactivated SCells to support a cell reselection among the deactivated SCells, and
reactivate the deactivated first SCell when the measurement of the deactivated first SCell is above a threshold.

20. A non-transitory, computer-readable medium storing computer-executable instructions that, when executed by a processor of a network node, configure the network node to perform operations corresponding to the method of claim 11.

* * * * *

UNITED STATES PATENT AND TRADEMARK OFFICE
CERTIFICATE OF CORRECTION

| | | |
|---|---|---|
| PATENT NO. | : 11,057,817 B2 | Page 1 of 1 |
| APPLICATION NO. | : 16/476458 | |
| DATED | : July 6, 2021 | |
| INVENTOR(S) | : Yilmaz et al. | |

It is certified that error appears in the above-identified patent and that said Letters Patent is hereby corrected as shown below:

In the Specification

In Column 5, Line 28, delete "(iii)" and insert -- (iv) --, therefor.

In Column 6, Line 18, delete ""iii sync"" and insert -- "in-sync" --, therefor.

In Column 6, Line 19, delete "1301" and insert -- T301 --, therefor.

In Column 6, Line 48, delete "specified" and insert -- specified in --, therefor.

In Column 7, Line 9, delete "LTE" and insert -- UE --, therefor.

In Column 7, Line 11, delete "according" and insert -- accordance --, therefor.

In Column 7, Line 23, delete "the of failure that war" and insert -- the type of failure that was --, therefor.

In Column 7, Line 28, delete "the net" and insert -- the network --, therefor.

In Column 15, Line 61, delete "fail" and insert -- failure --, therefor.

In Column 21, Line 28, delete "use equipment" and insert -- user equipment --, therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*